United States Patent
Chase et al.

(10) Patent No.: US 11,914,853 B2
(45) Date of Patent: *Feb. 27, 2024

(54) METHODS AND SYSTEMS FOR CONFIGURING AUTOMATIC MEDIA PLAYBACK SETTINGS

(71) Applicant: SPOTIFY AB, Stockholm (SE)

(72) Inventors: Adam Chase, Reading, MA (US); Andrew Greene, New York, NY (US); Christopher Barthle, Cambridge, MA (US); Eric Lundin, Medford, MA (US); Jeffrey Paul Baxter, Knoxville, TN (US); Kevin Sweeney, Medford, MA (US); Mark Kizelshteyn, New York, NY (US); Matthew Young-Wook Lim, New York, NY (US); Michelle Ackerman, Somerville, MA (US); Thomas Gayno, Brooklyn, NY (US); Kylan McBride, Brooklyn, NY (US); Joseph Levin, Brooklyn, NY (US)

(73) Assignee: Spotify AB, Stockholm (SE)

( * ) Notice: Subject to any disclaimer, the term of this patent is extended or adjusted under 35 U.S.C. 154(b) by 50 days.

This patent is subject to a terminal disclaimer.

(21) Appl. No.: 17/150,808

(22) Filed: Jan. 15, 2021

(65) Prior Publication Data

US 2021/0216198 A1    Jul. 15, 2021

Related U.S. Application Data

(63) Continuation of application No. 16/224,340, filed on Dec. 18, 2018, now Pat. No. 10,928,998.

(51) Int. Cl.
*G06F 3/0482*   (2013.01)
*G06F 3/16*     (2006.01)
(Continued)

(52) U.S. Cl.
CPC ........ *G06F 3/04847* (2013.01); *G06F 3/0482* (2013.01); *G06F 3/165* (2013.01);
(Continued)

(58) Field of Classification Search
CPC .... G06F 3/04847; G06F 3/0482; G06F 3/165; G06F 3/167; G06F 16/44; G06F 16/48;
(Continued)

(56) References Cited

U.S. PATENT DOCUMENTS 7,143,102 B2 * 11/2006 Fiennes .................. G06F 16/40
                                                      707/804
RE46,114 E    8/2016 Yellin et al.
(Continued)

FOREIGN PATENT DOCUMENTS

EP    2608076 A2 *  6/2013  .......... G06F 16/639
KR    101110539 B1 * 1/2012  ............ G11B 19/02
WO    2007/105180 A2  9/2007

OTHER PUBLICATIONS https://www.cnet.com/tech/mobile/disable-autoplay-for-facebook-mobile-videos-over-cellular/ (Year: 2013).*
(Continued)

*Primary Examiner* — Yongjia Pan
(74) *Attorney, Agent, or Firm* — Merchant & Gould P.C.

(57) ABSTRACT

Systems and methods are provided for configuring automatic playback settings on a media playback device. A graphical user interface displays automatic playback settings and receives selections of customized settings for automatic playback. The settings can include context granularity for automatic playback, limiting autoplay to when the media playback device is connected to a wireless network, and activating an audible notification when automatic playback of media content is beginning. An initial queue of media content is selected for playback on the media playback (Continued)

device. The system ascertains whether autoplay is enabled for a particular situation. If autoplay is enabled, the system automatically generates a queue of media that is related to the initial queue and initiates playback on the media playback device after the initial queue concludes.

19 Claims, 24 Drawing Sheets

(51) Int. Cl.
| | |
|---|---|
| *G06F 3/04847* | (2022.01) |
| *H04L 65/60* | (2022.01) |
| *G06F 16/44* | (2019.01) |
| *G06F 16/48* | (2019.01) |
| *H04W 84/12* | (2009.01) |

(52) U.S. Cl.
CPC .............. *G06F 3/167* (2013.01); *G06F 16/44* (2019.01); *G06F 16/48* (2019.01); *H04L 65/60* (2013.01); *H04W 84/12* (2013.01)

(58) Field of Classification Search
CPC ... H04L 65/60; H04L 65/762; H04L 65/1069; H04W 84/12
USPC ........................................................ 715/716
See application file for complete search history.

(56) References Cited

U.S. PATENT DOCUMENTS

| | | | | |
|---|---|---|---|---|
| 11,494,157 | B2* | 11/2022 | Reimann | G06F 16/4387 |
| 2003/0151589 | A1* | 8/2003 | Bensen | G06F 3/0481 |
| | | | | 345/156 |
| 2005/0240661 | A1* | 10/2005 | Heller | G06F 16/4387 |
| | | | | 709/219 |
| 2007/0061497 | A1* | 3/2007 | Takatsuka | G05B 15/02 |
| | | | | 711/100 |
| 2009/0282050 | A1 | 11/2009 | Thomas et al. | |
| 2010/0325125 | A1* | 12/2010 | Bomfim | G06F 16/4387 |
| | | | | 707/753 |
| 2011/0125297 | A1* | 5/2011 | Chu | G06F 16/639 |
| | | | | 707/E17.101 |
| 2011/0231762 | A1* | 9/2011 | Toida | G11B 27/034 |
| | | | | 715/716 |
| 2012/0082439 | A1 | 4/2012 | Ashbrook et al. | |
| 2012/0089910 | A1 | 4/2012 | Cassidy | |
| 2012/0323938 | A1* | 12/2012 | Skeen | H04L 65/61 |
| | | | | 707/754 |
| 2013/0109339 | A1 | 5/2013 | Lindahl et al. | |
| 2014/0095998 | A1* | 4/2014 | Bull | G06F 3/048 |
| | | | | 715/716 |
| 2014/0283142 | A1 | 9/2014 | Shepherd et al. | |
| 2016/0371053 | A1 | 12/2016 | Jellison, Jr. et al. | |
| 2017/0180772 | A1 | 6/2017 | Wilms et al. | |
| 2017/0357421 | A1* | 12/2017 | Dye | H04N 21/8113 |
| 2018/0239502 | A1* | 8/2018 | Anzures | G06F 1/1626 |
| 2018/0324567 | A1 | 11/2018 | Mao | |
| 2019/0341010 | A1* | 11/2019 | Wipperfürth | G06F 3/165 |
| 2020/0159487 | A1* | 5/2020 | Dawson | G06F 3/16 |
| 2020/0409535 | A1* | 12/2020 | Corbin | H04N 21/4622 |
| 2021/0216198 | A1* | 7/2021 | Chase | H04L 65/60 |
| 2021/0271444 | A1* | 9/2021 | Reimann | H04N 21/6175 |

OTHER PUBLICATIONS

Ed Rhee, Disable autoplay for Facebook mobile videos over cellular, retrieved from—https://www.cnet.com/tech/mobile/disable-autoplay-for-facebook-mobile-videos-over-cellular/, Dec. 12, 2013, 4 pages (Year: 2013).*
Ben Popper, Spotify will now serve up a daily selection of personalized playlists, retrieved from—https://www.theverge.com/2016/9/27/13068196/spotify-daily-mix-discovery-personalization, Sep. 27, 2016, 3 pages (Year: 2016).*
Switch (On/Off) Tutorial With Example in Android Studio, retrieved from—https://web.archive.org/web/20171203052702/https://abhiandroid.com/ui/switch, Dec. 3, 2017, 11 pages (Year: 2017).*
Snap-to-increment Ranger Slider vs. Buttons, retrieved from - https://ux.stackexchange.com/questions/95958/ snap-to-increment-ranger-slider-vs-buttons, Jun. 22, 2016, 2 pages (Year: 2016).*
Micah Singleton, Pandora Premium unveiled, coming early next year for $10 per month, retrieved from—https://www.theverge.com/2016/12/6/13846936/pandora-premium-music-streaming-service, Dec. 6, 2016, 4 pages (Year: 2015).*
Diana Lin, Sampath Jayarathna, Automated Playlist Generation from Personal Music Libraries, retrieved from—https://ieeexplore.ieee.org/abstract/document/8424710, Jul. 6-9, 2018, 8 pages (Year: 2018).*
PlayList SWitcher, retrieved from—https://winampheritage.com/plugin/playlist-switcher/127954, Feb. 16, 2003, 3 pages (Year: 2003).*
Bettina Mangiaracina, Manage Your Notifications for a Better User Experience, retrieved from—https://smartphones.gadgethacks.com/how-to/soundcloud-101-manage-your-notifications-for-better-user-experience-0178851/, Jul. 19, 2017, 4 pages (Year: 2017).*
Should parent toggles control child toggles?, retrieved from—https://ux.stackexchange.com/questions/99634/should-parent-toggles-control-child-toggles, Sep. 22, 2016, 3 pages (Year: 2016).*
How to best filter data with multiple toggle buttons?, retrieved from—https://ux.stackexchange.com/questions/112342/how-to-best-filter-data-with-multiple-toggle-buttons, Oct. 1, 2017, 6 pages (Year: 2017).*
Toggle-Buttons mutually exclusive and multiple selection combined, retrieved from—https://ux.stackexchange.com/questions/75760/toggle-buttons-mutually-exclusive-and-multiple-selection-combined, Apr. 2, 2015, 2 pages (Year: 2015).*
"Autoplay videos," YouTube. Accessed Feb. 1, 2018. Available at: https://support.google.com/youtube/answer/6327615?co=GENIE.Platform%3DAndroid&hl=en.
Harry Guinness, "How to Stop Spotify from Auto-Playing Music after you Finish a Playlist or Album", How-To Geek, Oct. 26, 2017. Available Online at: https://www.howtogeek.com/330757/how-to-stop-spotify-from-auto-playing-music-after-you-finish-a-playlist-or-album/.
Jocke-Strid, "I actually WANT autoplay", The Spotify Community, May 13, 2017. Available Online at: https://community.spotify.com/t5/iOS-iPhone-iPad/I-actually-WANT-autoplay/td-p/1676712.
Chandra Steele, https://www.pcmag.com/news/how-to-turn-off-autoplay-videos (Year 2017).
Pandora blog, https://blog.pandora.com/us/the-beat-goes-on-introducing-autoplay-on-premium/ (Year: 2017).
Tom blog, http://community.spotify.com/t5/iOS-iphone-ipad/i-actually-WANT-autoplay/td-p/1676712 (Year:2018).

* cited by examiner

| Context Name | Context ID | Context Type | Autoplay enabled? |
|---|---|---|---|
| Backyard BBQ | 89660112 | Playlist | Y |
| This Is Acting | 29985300 | Album | N |
| Classical Essentials | 36941223 | Playlist | Y |
| Skrillex | 26994023 | Artist | Y |
| Tropical Haus | 26991852 | Playlist | Y |
| Rock Hard | 51236991 | Playlist | Y |
| Wiz Khalifa | 45685233 | Artist | Y |
| Focus | 98856322 | Song | N |
| No Angel | 98856323 | Song | N |
| True Romance | 68996211 | Album | N |
| AFI | 56841125 | Artist | Y |
| Banks | 26998211 | Artist | Y |
| Study Vibes | 26811023 | Playlist | Y |

*FIG. 9*

Now Playing

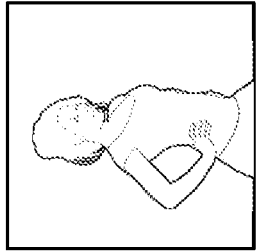

Album: High Hope by Florence Machine
2018 – 10 songs – 40 min

| Title | Artist | Album |
|---|---|---|
| Sky Full of Song | Florence Machine | High Hope |
| Grace | Florence Machine | High Hope |
| Patricia | Florence Machine | High Hope |
| 100 Years | Florence Machine | High Hope |
| The End Of Love | Florence Machine | High Hope |
| No Choir | Florence Machine | High Hope |
| Autoplay: Album Radio -- High Hope | | |
| Cosmic Love | Florence Machine | Lungs |
| Turn | The Meerkats | Turn |
| Rainy Days | Lykke Li | Sad and Sexy |
| Deliverance | Church | Love Is Dead |

*FIG. 22*

Now Playing

Album: High Hope by Florence Machine
2018 – 10 songs – 40 min

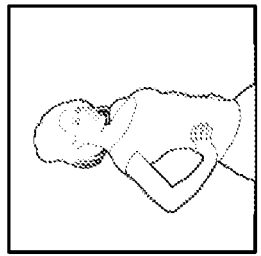

| Title | Artist | Album |
|---|---|---|
| Sky Full of Song | Florence Machine | High Hope |
| Grace | Florence Machine | High Hope |
| Patricia | Florence Machine | High Hope |
| 100 Years | Florence Machine | High Hope |
| The End Of Love | Florence Machine | High Hope |
| No Choir | Florence Machine | High Hope |
| Autoplay: Playlist -- This is Florence Machine | | |
| Water Gifts | Florence Machine | Ceremonials |
| Dog Days | Florence Machine | Lungs |
| How Beautiful | Florence Machine | How Big, How Blue |
| Breath of Life | Florence Machine | Ceremonials |

METHODS AND SYSTEMS FOR CONFIGURING AUTOMATIC MEDIA PLAYBACK SETTINGS

CROSS REFERENCE TO RELATED APPLICATIONS

This application is a Continuation of U.S. patent application Ser. No. 16/224,340, filed 18 Dec. 2018, and which application is incorporated herein by reference. To the extent appropriate, a claim of priority is made to each of the above disclosed applications.

BACKGROUND

Music streaming services have made it easy and convenient for users to access a plethora of different types of media content easily. The media content can include music, podcasts, news programs, videos, TV shows, audio books and the like. Many services provide access to a large media library of content without requiring the purchase of individual media files or downloading any of those files. Users can stream media content to almost any device that can connect to the internet and output audio and/or video.

Access to such a large library of media content can be overwhelming. It can be difficult for users to select the music they want to listen to and, as a result, media streaming providers often provide playlists or queues of media content.

Once selected content has been played, often the playback of media content ends, requiring the user to once again select further media content in order to continue listening. This continual need to select new content can decrease the users enjoyment.

SUMMARY

In general terms, the present disclosure relates to configuring automatic media playback settings. In one possible configuration and by non-limiting example, a media playback device is configured to automatically generate queues of media content based on a media context category that the media playback device was playing. Various aspects are described in this disclosure, which include, but are not limited to, the following aspects.

One aspect is a computer implemented method for configuring automatic playback settings on a media playback device. The method begins by displaying a graphical user interface that includes a plurality of selectors for enabling and disabling automatic playback of media content. Each of the selectors corresponds to a media context category. Selections of one or more of the selectors are received to enable at least one media context category for autoplay. A selection of media content is received for playback on a media playback device. The media content is an initial queue of media content items. The initial queue of media content items is retrieved and played on the media playback device. A first media context category corresponding to the initial queue of media content items is ascertained. It is then determined whether the first media context category is enabled for automatic playback of media content. Upon determining that the first media context category is enabled for automatic playback of media content, an autoplay queue of media content items is retrieved. The autoplay queue of media content items is related to the initial queue of media content items. Upon concluding playback of the first queue of media content items, playback of the autoplay queue of media content items is automatically initiated.

Another aspect is a system for configuring automatic playback settings for queues of media content. The system includes a media delivery system. The media delivery system includes a media data store, a media stream service, a media application interface, and an autoplay engine. The media data store is configured to store media content. The media stream service is configured to stream the media content to a media playback device. The media application interface is configured to present a plurality of media playback options on a display of the media playback device. The autoplay engine includes a granular control module, an autoplay settings data store, and an autoplay queue generator. The granular control module is configured to receive selections of automatic playback settings, that enable or disable automatic playback of an autoplay queue for each of a plurality of media context categories. The granular control module is further configured to ascertain a media context category corresponding to an initial queue of media content being streamed from the media stream service, and determine whether the media context category is enabled for automatic playback.

Yet another aspect is one or more computer-readable media having computer-executable instructions embodied thereon that, when executed by one or more computing device, cause the computing devices to perform the following steps. A graphical user interface is displayed on a display of the media playback device. The graphical user interface includes an autoplay toggle selector for enabling and disabling automatic playback of a second queue of media content after a first queue of media content has concluded. The graphical user interface further includes two or more context toggle selectors for enabling and disabling automatic playback based on a media context category. Upon receiving a selection to enable automatic playback, the selection is stored in an autoplay settings data store.

In another aspect, a computer-implemented method for configuring automatic playback settings on a media playback device is provided. The method comprises: displaying on a media playback device a graphical user interface comprising at least one selector, the selector being operable to enable or disable playback of the audible notification to indicate that playback of the initial queue has concluded and playback of the autoplay queue will begin; receiving input at the selector to enable playback of the audible notification; receiving a selection of media content for playback on the media playback device, the media content comprising an initial queue of media content items; retrieving and playing the initial queue of media content items on the media playback device; determining that the audible notification selector is enabled; upon concluding playback of the initial queue of media content items, playing an audible notification on the media playback device; automatically retrieving and initiating playback of an autoplay queue of media content items on the media playback device, the media content items of the autoplay queue being related to the media content items in the initial queue.

In another embodiment, a computer-implemented method for configuring automatic playback settings on a media playback device is provided. The method comprises: displaying a graphical user interface comprising at least one selector having a first state and a second state, the first state disabling automatic playback of media content when the media playback device is not connected to a wireless network and the second state enabling automatic playback of media content regardless of whether the media playback device is connected to a wireless network; receiving a selection of media content for playback on the media playback device, the media content comprising a first queue of media content items; retrieving and playing the first queue of media content items on the media playback device; determining whether the selector is in the first state or the second state; when determined that the selector is in the first state, ascertaining whether the media playback device is connected to a wireless network; when determined that the selector is in the second state or that the selector is in the first state and the media playback device is connected to a wireless network, retrieving a second queue of media content items, the second queue of media content items being related to the first queue of media content items; and upon concluding playback of the first queue of media content items, automatically initiating playback of the second queue of media content items.

BRIEF DESCRIPTION OF THE DRAWINGS

FIG. 9 illustrates an example data table that could be referenced by the granular control module.

FIG. 22 illustrates another view of the example display of the initial queue of media content items of FIG. 21 followed by an autoplay queue of media content items.

FIG. 24 illustrates another view of the example display of the initial queue of media content items of FIG. 21 followed by an autoplay queue of media content items.

DETAILED DESCRIPTION

Figure 1:
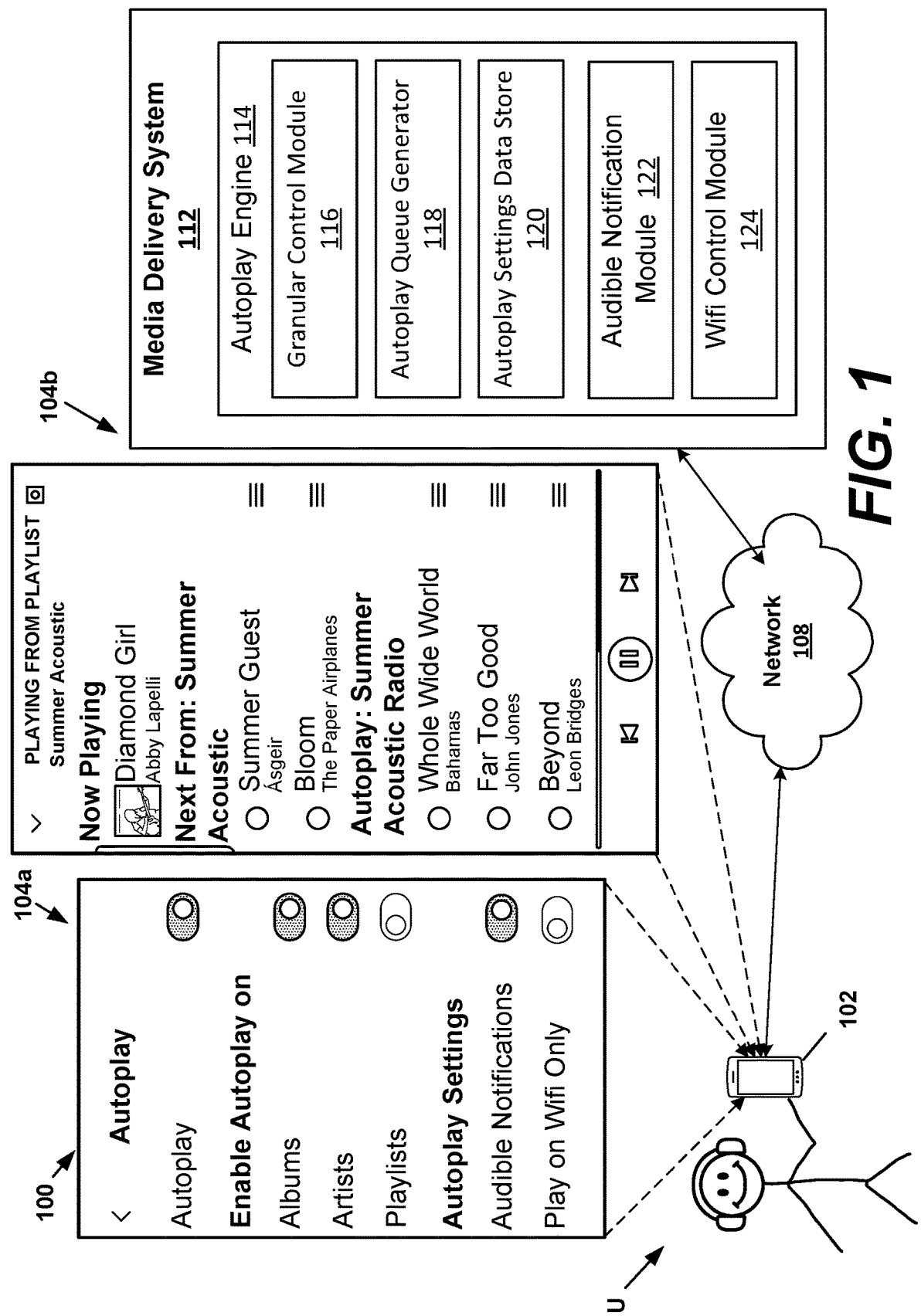
FIG. 1 illustrates an example system for configuring automatic playback settings on a media playback device.

Various embodiments will be described in detail with reference to the drawings, wherein like reference numerals represent like parts and assemblies throughout the several views.

As used herein, the term "media content" refers to audio content, video content, and combinations thereof. Examples of audio content include songs, albums, playlists, radio stations, podcasts, audiobooks, and other audible media content items. Examples of video content include movies, music videos, television programs, and other visible media content items. In many cases, video content also includes audio content.

The term "queue" refers to a playlist or upcoming lineup of media content items that will be played on a media playback device. A queue can be a list of finite length. Alternatively, a queue can be continually updated to generate new media content items for the list as the queue is played.

The term "track" refers to a single media content item such as a song.

The term "radio" as used herein refers to a queue of media content that is generated by a media content streaming service. The queue is typically generated based on a seed song, artist, album, playlist, or genre. Media content items are selected for the "radio station" based on similarities of attributes of the seed.

The term "media context" refers to the category of media queue. There are multiple varieties of queues of media content. For example, categories of media queues can include playlists, albums, artists, genres, and songs. The media context refers to the type of relationship that exists between one or more media content items.

An automatic media playback service or "autoplay" service automatically generates media content for playback without additional input from the user. In some embodiments, the automatically generated media content is similar to what a user has just consumed.

A user selects a queue of media content items to listen to, such as an album by a particular artist, and that album plays through the music streaming service. The user would like to keep listening to similar music once that album has concluded, but the user does not want to think about choosing more music to listen to and would prefer for the system to automatically choose additional media content to listen to after that album has concluded. For example, if a user has selected a playlist entitled "Beach Party" to play while at a beach party, the user is unlikely to wish to have to select additional music to play once that playlist has ended. The user is enjoying the party and does not want to spend time finding another appropriate playlist. However, due to the large selection of music available, users don't necessarily wish to repeat the same content that they have just listened to.

Essentially, the autoplay service will choose media content that is similar to what the user was just listening to. In this example, the user might have been listening to a particular album by a particular artist. The autoplay system might then automatically start playback of a different album by the same artist. There are numerous methods by which the autoplay system could generate additional media content.

In one example, the new autoplay queue is generated using radio algorithms. 40 dimensional methods and personalized user vectors are utilized to select media content items that are related to a seed. The seed can be a song, an artist, an album, a playlist, or a genre. The radio queue could be steered using thumbs up or thumbs down to influence future songs that are selected. The queue of radio songs could also be personalized to the particular user's vector.

In another method of generating automatic playback, a playlist can be selected that is similar to the context that the user was just listening to. The playlist could be selected based on an overlap of artists and/or songs with the original music context. In the example of the user listening to a particular album by a particular artist, auto-play could then select a curated music playlist that includes songs from that artist and album. In other examples, the playlist could be selected based on a similar genre and other musical attributes. In some instances, the playlists are selected for co-occurrence and include songs that the user is likely to enjoy based on past listening history.

A variety of factors can be considered in selecting the media for the autoplay queue. For example the acoustic elements of the most recently played songs that were selected by the user could be used to match to the new autoplay media content. External attributes and user attributes could also be utilized. Playlist co-occurrence or playlist extender could be utilized. The autoplay queue of media content items is selected based on at least one attribute associated with the initial queue of media content items. Example attributes include one or more acoustic elements of media content items in the first queue; a user preference; a geographic location; a time of day; and an external attribute.

In some instances, the autoplay feature might query the user to determine if the user has a preference between two or more queues of media content to begin playback after the initially selected que has concluded. For example, the autoplay system might present two different curated playlists for the user to choose from. After a predetermined amount of time, such as ten seconds, the system could automatically select a default playlist for the user.

A user can access settings associated with the user's account to select whether or not the autoplay service is enabled. First, the user can select to enable autoplay or disable autoplay. If autoplay is disabled, no automatic queues of media content will be generated if selected media content queues conclude. If autoplay is enabled, the previously described automatic queues of related media content will be generated.

The user can enable or disable the autoplay feature by selecting a settings icon on a user interface and then selecting to turn on or off autoplay with a selector such as a toggle. In some instances, the autoplay feature could be turned on or off without accessing a settings interface. In some instances, the user can make selections for enabling autoplay with more granularity with respect to the media context.

Categories of media context can be presented on a user interface to the user for selection to enable or disable auto-play for that particular context. Categories of media context can include songs, albums, artists, playlists and radio stations. Categories of media context for other types of media contents such as audio books or videos could include episodes, series, or individual videos or clips.

Another setting that can be enabled or disabled is an audible notification. Users are alerted when the automatic playback service goes into effect. For example, a user may wish to be notified when the media content that the user selected is concluding playback and when media content that is automatically selected is beginning playback. This can also be controlled in a settings menu. The audible notification can be turned on or off with a selector, such as a toggle.

Another setting that can be enabled or disabled is an option to disable automatic playback when the media playback device is not connected to a wireless LAN. A user may not wish to have continual media streaming when the streaming device is connected to a data network that could incur additional charges for data use. However, the user may wish to utilize an automatic playback feature when a wireless local area network (WLAN) connection is available that does not incur additional charges. This can also be controlled in a settings menu. This feature can be turned on or off with a selector, such as a toggle. When the automatic playback is enabled and the "wifi only" setting is turned off, automatic playback will be enabled regardless of a wifi connection. When the automatic playback is enabled and the "wifi only" setting is turned on, automatic playback will initiate only when the media playback device is connected to a WLAN.

FIG. 1 illustrates an overview of example system 100 for configuring automatic playback settings on a media playback device. A user U is operating a media playback device 102. The media playback device 102 includes a graphical user interface (GUI) shown on a display 104. The media playback device 102 communicates with a network 108 that is also in communication with a media delivery system 112. The media delivery system 112 includes an autoplay engine 114. The media delivery system 112 operates to provide media content for playback on the media playback device 102. In some examples, the media content is provided by streaming through the network 108. In other examples, media content is communicated through the network 108 to the media playback device 102, where it is saved or cached for later playback.

The autoplay engine 114 includes a granular control module 116, an autoplay queue generator 118, an autoplay settings data store 120, an audible notification module 122, and a wifi control module 124. The granular control module 116 operates to present a graphical user interface such as the one shown in the display 104a. Selections are received from the user U through the GUI to enable automatic playback of media content based on selected media contexts. The selections are stored in the autoplay settings data store 120.

The WiFi control module 124 operates to detect when the media playback device 102 is connected to a WLAN such as a WiFi network. The WiFi control module 124 also records user input for the WiFi only setting and determines whether it is enabled or disabled. Thus, the WiFi control module 124 determines whether a WiFi connection is required to initiate autoplay and then, if the WiFi connection is required, determines whether the media playback device 102 is connected to WiFi. In some embodiments, the WiFi control module 124 also communicates with the WiFi control module 124 to determine that the wireless network to which the media playback device 102 is connected has sufficient signal strength to support streaming of media content items.

The audible notification module 122 operates to detect when an initial queue of media content items is going to conclude playback and when an autoplay queue of media content items is about to begin playback. The audible notification module 122 plays an audible notification or alert sound in between the end of the last media content item of the initial queue and the beginning of the first media content item of the autoplay queue.

The settings data store 120 operates to store selections that are received for various autoplay settings.

The autoplay queue generator 118 operates to generate a queue of media content that is provided to the media playback device 102 after an initially selected queue of media content has ceased. The autoplay queue generator 118 selects a new queue of media content based on various factors of the initial queue of media content. An example of the new media content queue is displayed in 104b, following the conclusion of the initial playlist "Summer Acoustic."

Figure 2:
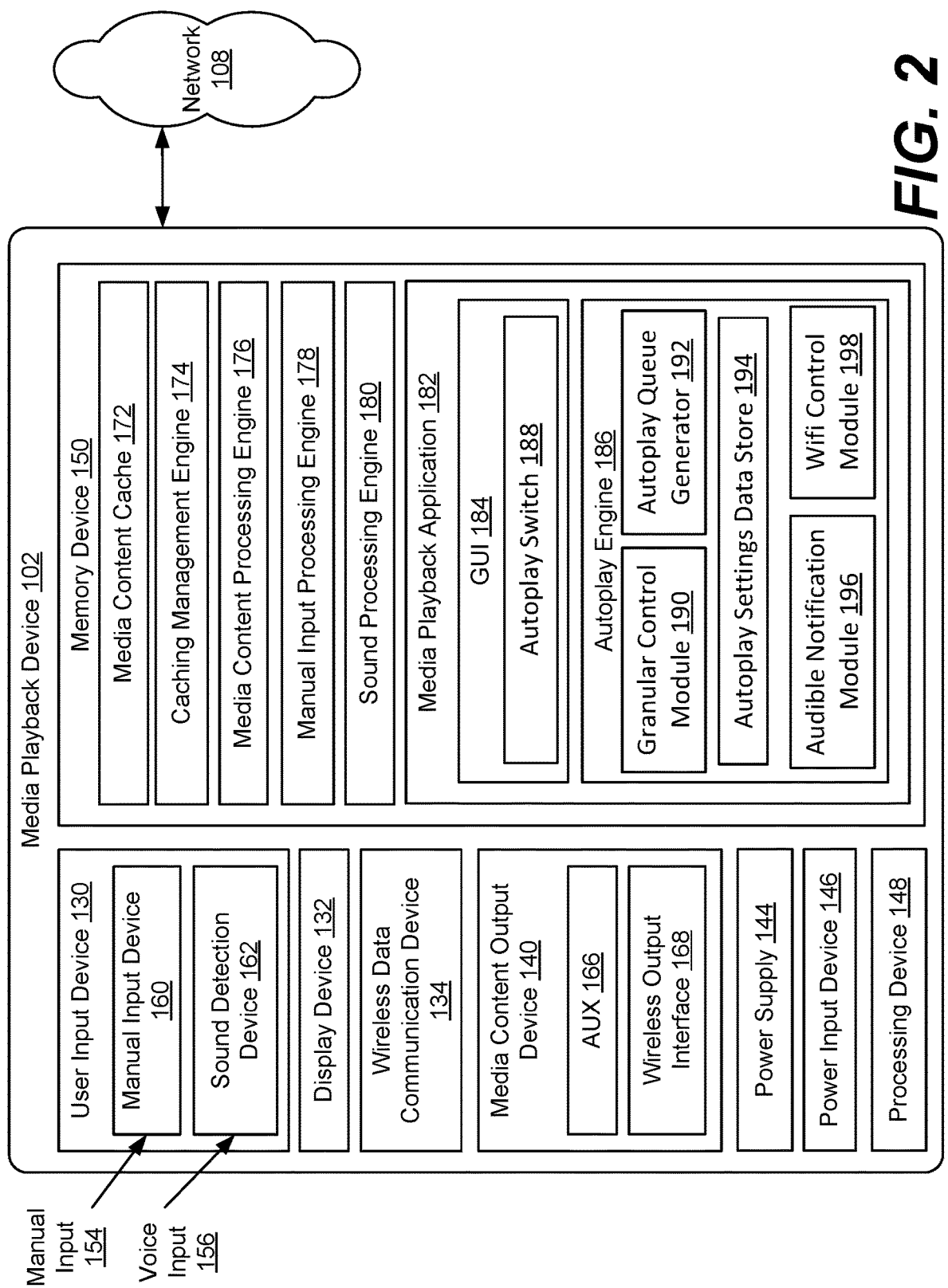
FIG. 2 illustrates a detailed block diagram of the media playback device of the system shown in FIG. 1.

FIG. 2 illustrates a detailed block diagram of the media playback device 102 of the system 100 shown in FIG. 1. The media playback device 102 is in communication with a network 108.

The network 108 is a data communication network through which the media playback device 102 and the media delivery system 112 can communicate. The network 108 typically includes a set of computing devices and communication links between the computing devices. The computing devices in the network 108 use the links to enable communication among the computing devices in the network. The network 108 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 108 includes various types of communication links. For example, the network 108 can include wired and/or wireless links, including cellular, Bluetooth, ultra-wideband (UWB), 802.11, ZigBee, and other types of wireless links. Furthermore, in various embodiments, the network is implemented at various scales. For example, the network 108 can be implemented as one or more vehicle area networks, local area networks (LANs), metropolitan area networks, subnets, wide area networks (WAN) (such as the Internet), or can be implemented at another scale. Further, in some embodiments, the network 108 includes multiple networks, which may be of the same type or of multiple different types.

In the example of FIG. 2, the media playback device includes a user input device 130, a display device 132, a wireless data communication device 134, a media content output device 140, a power supply 144, a power input device 146, a processing device 148, and a memory device 150.

The user input device 130 operates to receive a user input for controlling the media playback device 102. As illustrated, the user input can include a manual input 154 and/or a voice input 156. In some embodiments, the user input device 130 includes a manual input device 160 and a sound detection device 162.

The manual input device 160 operates to receive the manual input 154 for controlling playback of media content via the media playback device 102. In addition, in some embodiments, manual input 154 is received for managing and/or controlling other functions or aspects associated with the media playback device 102.

In some embodiments, the manual input device 160 includes one or more manual control elements configured to receive various manual control actions, such as pressing actions and rotational actions. Such control elements could be buttons or knobs. In other embodiments, the manual input device 160 includes a touch screen that accepts gestures made with a user's fingers or a stylus.

The sound detection device 162 operates to detect and record sounds from proximate to the media playback device 102. For example, the sound detection device 162 can detect sounds including the voice input 156. In some embodiments, the sound detection device 162 includes one or more acoustic sensors configured to detect sounds proximate to the media playback device 102. For example, acoustic sensors of the sound detection device 162 includes one or more microphones. Various types of microphones can be used for the sound detection device 162 of the media playback device 102.

In some embodiments, the voice input 156 is a user's voice for controlling playback of media content via the media playback device 102. In addition, the voice input 156 manages various data transmitted via the media playback device 102 and/or controlling other functions or aspects associated with the media playback device 102.

In some embodiments, the sounds detected by the sound detection device 162 can be processed by the sound processing engine 180 of the media playback device 102 as described below.

Referring still to FIG. 2, the display device 132 operates to display information to the user. Examples of such information include media content playback information, notifications, and other information. The display device 132 also operates to display graphic user interfaces (GUIs) to facilitate user interaction with the media playback device 102. One such GUI is the GUI 184 for the media playback application 182.

In some embodiments, the display device 132 is configured as a touch-sensitive display screen that operates as both a display screen and a user input device. In other embodiments, the display device 132 may not operate as a user input device and input is received through physical controls on the media playback device 102.

The wireless data communication device 134 operates to enable the media playback device 102 to communicate with one or more computing devices at a remote location. For example, the wireless data communication device 134 is configured to communicate with the media delivery system 112 and receive media content from the media delivery system 112 at least partially via the network 108. The wireless data communication device 134 can be a wireless network interface of various types which connects the media playback device 102 to the network 108. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In some embodiments, the wireless data communication device 134 is configured as a cellular network interface to facilitate data communication between the media playback device 102 and the media delivery system 112 over cellular network.

The media content output device 140 is an interface that enables the media playback device 102 to play media content. In some embodiments, the media content output device 140 includes an auxiliary (AUX) output interface 166 and a wireless output interface 168.

The AUX output interface 166 is configured to connect the media playback device 102 to an external audio output device such as a speaker. This connection can be made through a cable extending from the media playback device 102 to an input jack or port on the external audio output device. The cable can be of various types, such as an analog audio cable or a USB cable.

The wireless output interface 168 is configured to connect the media playback device 102 to an external audio output device via a wireless communication protocol. In some embodiments, the wireless output interface 168 is configured for Bluetooth connection. In other embodiments, the wireless output interface 168 is configured for other types of wireless connection.

The power supply 144 is included in the example media playback device 102 and is configured to supply electric power to the media playback device 102. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the media playback device 102 and is not removable from the media playback device 102. In other embodiments, the power supply 144 is removable from the media playback device 102.

The power input device 146 is configured to receive electric power to maintain activation of components of the media playback device 102.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, and a media playback application 182.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In other embodiments, the caching management engine 174 operates to cache at least a portion of media content into the media content cache 172 while online so that the cached media content is retrieved for playback while the media playback device 102 is offline.

The media content processing engine 176 is configured to process the media content that is received from the media delivery system 112, and generate playback through the media content output device 140.

The manual input processing engine 178 operates to receive the manual input 154 via the manual input device 160. In some embodiments, when the manual input device 160 is actuated (e.g., swiped or tapped) upon receiving the manual input 154, the manual input device 160 generates an electric signal representative of the manual input 154. The manual input processing engine 178 can process the electric signal and determine the input (e.g., command or instruction) corresponding to the manual input 154 to the media playback device 102. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter voice input 156 from noises included in the detected sounds. Various noise cancellation technologies, such as active noise control or cancelling technologies or passive noise control or cancelling technologies, can be used for filter the voice input from ambient noise.

In some embodiments, a recording of sounds captured using the sound detection device 162 can be analyzed using speech recognition technology to identify words spoken. The words may be recognized as commands that alter the playback of media content and/or other functions or aspect of the media playback device 102. In some embodiments, the words and/or the recordings may also be analyzed using natural language processing and/or intent recognition technology to determine appropriate actions to take based on the spoken words.

The media playback application 182 includes a GUI 184 and an autoplay engine 186. The GUI 184 includes an autoplay switch 188. The autoplay engine 186 includes a granular control module 190, an autoplay queue generator 192, an autoplay settings data store 194, an audible notification module 196, and a wifi control module 198. The media playback application 182 operates to present a graphical user interface 184 on the media playback device 102 via a display device 132. The media playback application 182 also generates media content to be played through the media content output device 140. In some instances, the media playback application 182 receives media content through the wireless data communication device 134. The GUI 184 generate an interface through which a user can select media content to play, adjust settings for playback, and update user profile information.

The GUI 184 generates an interface through which a user can select media content to play, adjust settings for playback, and update user profile information. An example of the GUI 184 is shown on the display 104 of the media playback device 102 in FIG. 1. The GUI 184 generates various graphical control elements for controlling playback of media content. In particular, an autoplay switch 188 is displayed on the GUI 184. The autoplay switch 188 can be actuated with user input such as a touch or click. The autoplay switch 188 operates to show the current status of automatic playback settings as well as receive input to change the current settings of automatic playback on a media playback device.

The autoplay engine 186 operates to control the automatic generation of media content queues to be automatically played after an initial queue of media content selected by the user has concluded. The autoplay engine 186 includes a granular control module 190, an autoplay queue generator 192, an autoplay settings data store 194, an audible notification module 196, and a wifi control module 198. Some embodiments of the autoplay engine 186 may only include one or two of the modules.

The granular control module 190 operates to receive selections of automatic playback settings that enable or disable automatic playback of an autoplay queue. The selections are saved in the autoplay settings data store 194. The granular control module then ascertains the media context category corresponding to the initial queue of media content and determines whether autoplay is enabled for that context. Upon ascertaining that media playback is enabled, the granular control module 190 communicates with the autoplay queue generator 192 to generate an autoplay queue of related media content.

The autoplay queue generator 192 operates to generate an autoplay queue of media content items and communicates that queue to the media stream service. The autoplay queue generator 192 determines an appropriate type of content for the autoplay queue and then selects media content items that are related to the currently playing initial queue of media content items.

The autoplay settings data store 194 operates to save the selections for automatic playback. The selections can be stored in a table or other suitable means. The settings can be saved in association with a particular user account.

The audible notification module 196 operates to provide an audible notification to indicate when media playback switches from a user selected initial queue of media content items to an automatically selected autoplay queue of media content items. The audible notification module 196 can determine whether an audible notification is enabled or disabled. In some embodiments, the audible notification can determine which type of audible notification should be played. For example, a user could select a preference for a short tone to be played, a series of tones, or a verbal announcement.

The Wifi control module 198 operates to determine which state a wifi control selector is in. The Wifi control module 198 also operates to determine whether there is a wireless connection such as WLAN. The Wifi control module 198 is similar to the Wifi control module 124 of FIG. 1.

Figure 3:
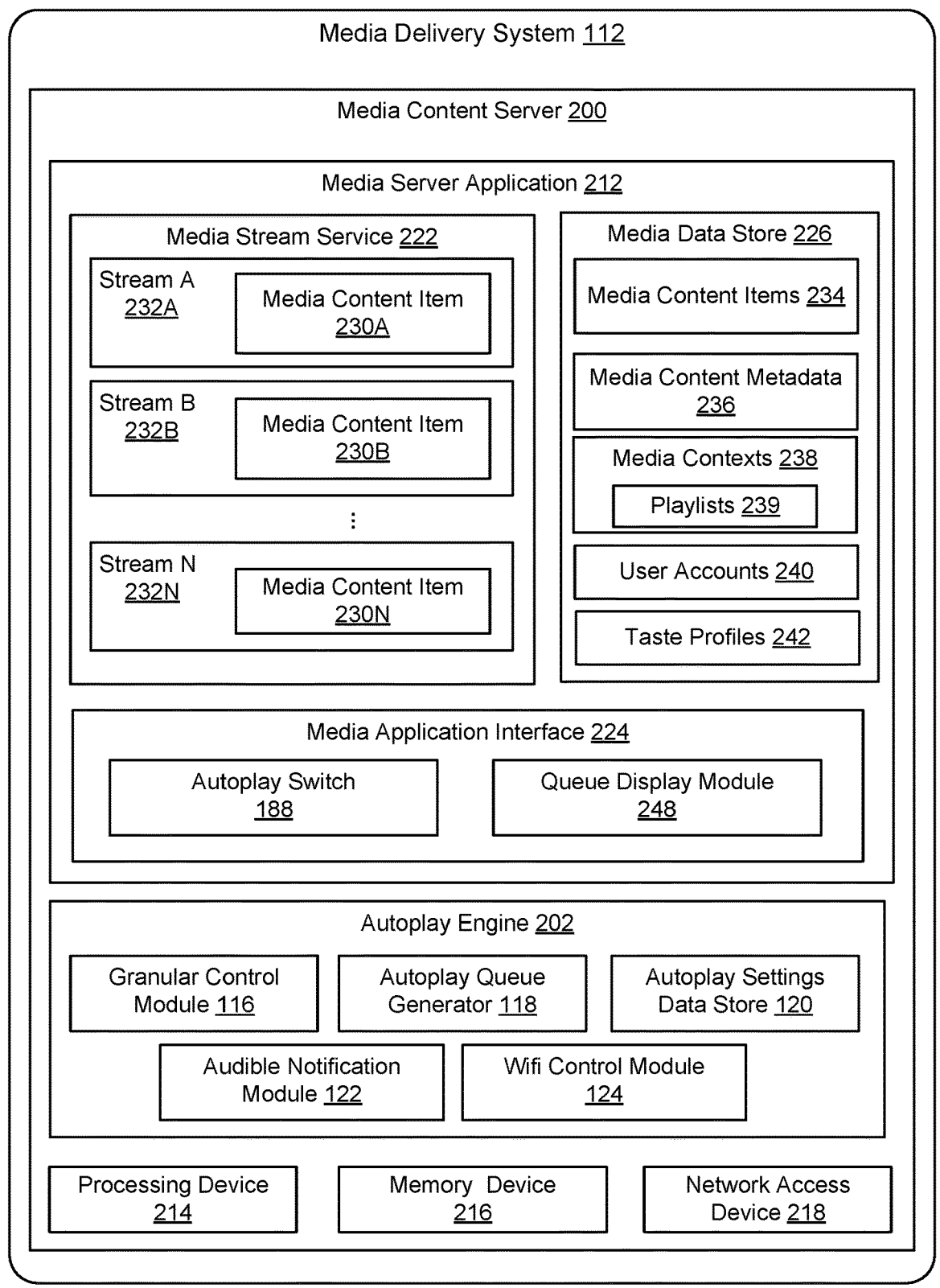
FIG. 3 is a block diagram of an example embodiment of the media delivery system of FIG. 1.

FIG. 3 is a block diagram of an example embodiment of the media delivery system 112 of FIG. 1. The media delivery system 112 includes a media content server 200.

The media delivery system 112 comprises one or more computing devices and provides media content to the media playback device 102 and, in some embodiments, other media playback devices, as well. In addition, the media delivery system 112 interacts with the media playback device 102 to provide the media playback device 102 with various functionalities.

Although FIG. 3 shows a single media content server 200, some embodiments include multiple media content servers. In these embodiments, each of the multiple media servers may be identical or similar to the media content server 200 as described herein, and may provide similar functionality with, for example, greater capacity and redundancy and/or services from multiple geographic locations. Alternatively, in these embodiments, some of the multiple media servers, may perform specialized functions to provide specialized services. Various combinations thereof are possible as well.

The media content server 200 transmits stream media 210 (FIG. 2) to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 108. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 includes an autoplay switch 188 and a queue display module 248. The autoplay switch 188 is a graphical element that is displayed on a GUI such as the GUI shown in the display 104 of FIG. 1 and is operable to receive input to change an autoplay setting. In particular, the autoplay switch 188 is operable to enable or disable automatic playback of media content items.

Figure 21:
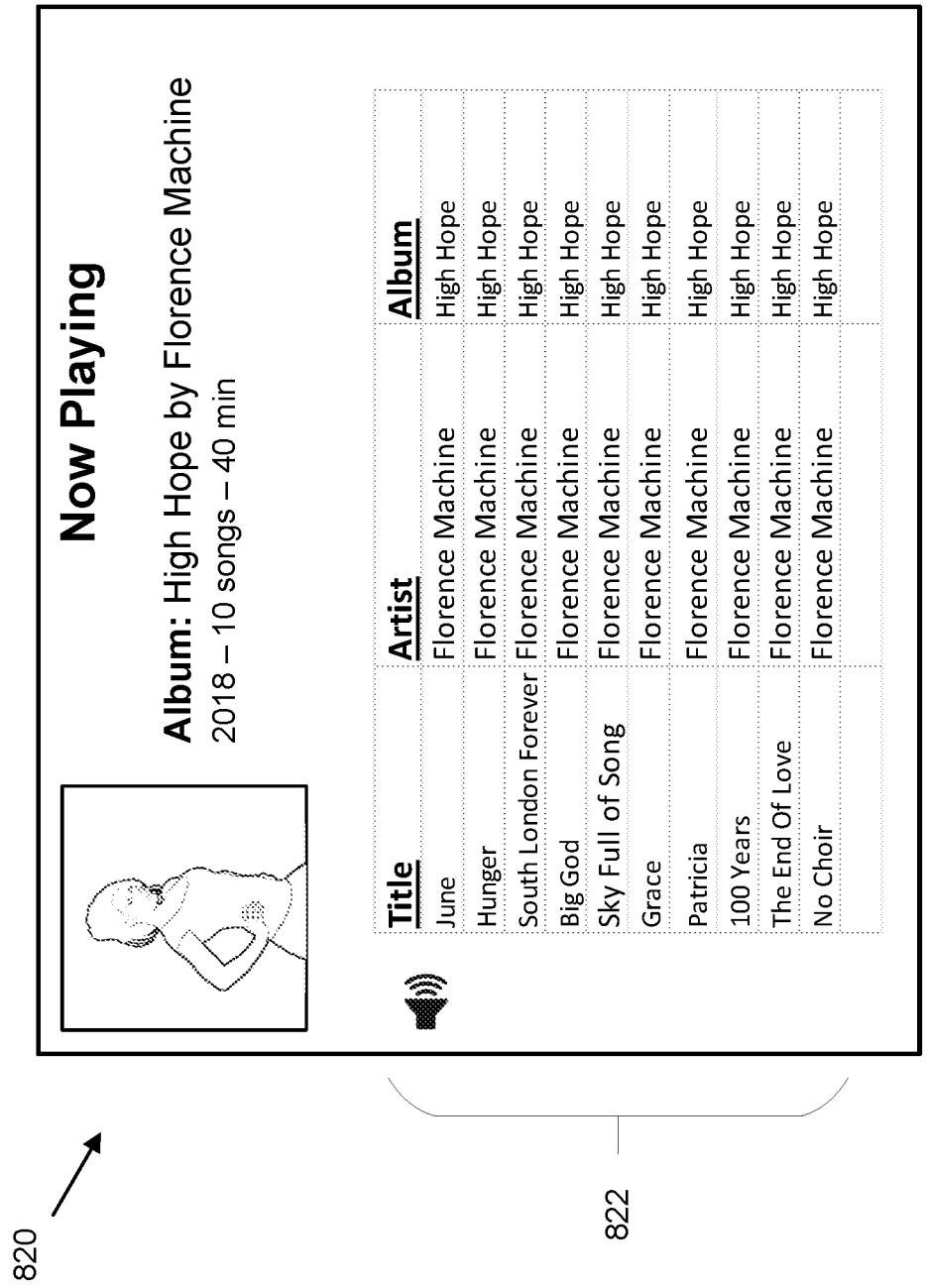
FIG. 21 illustrates an example display of an initial queue of media content items.

The queue display module 248 operates to display initial queues and autoplay queues on a GUI. The queue display module 248 can indicate which track within a queue is currently playing and which tracks are coming up. An example display generated by the queue display module 248 is shown in FIGS. 21, 22, and 24.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

Explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.), for a large library of songs or tracks can be evaluated and provided by one or more third party service providers. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 238 identify a group of the media content items 234 in a particular order. In other embodiments, the playlists 238 merely identify a group of the media content items 234 without specifying a particular order. Some, but not necessarily all, of the media content items 234 included in a particular one of the playlists 238 are associated with a common characteristic such as a common genre, mood, or era.

In some embodiments, media content items in a playlist 238 can be played by selecting the playlist 238 via a media playback device, such as the media playback device 102. The media playback device then operates to communicate with the media delivery system 112 so that the media delivery system 112 retrieves the media content items identified by the playlist 238 and transmits data for the media content items to the media playback device for playback.

In some embodiments, the playlist 238 includes a playlist title and a list of content media item identifications. The playlist title is a title of the playlist, which can be received through inputs on a media playback device 102. The list of content media item identifications includes one or more media content item identifications (IDs) that refer to respective media content items 234.

The user accounts 240 are used to identify users of a media streaming service provided by the media delivery system 112. In some embodiments, a user account 240 allows for authentication before providing access to the media delivery system 112. In some embodiments, input for login can be received at different devices to access data associated with the user account in the media delivery system 112. User authentication information, such as a username, an email account information, a password, and other credentials, can be used to access a user media streaming account 240.

The user accounts 240 include data for devices associated with each user account. The user accounts 240 data store keeps track of the devices that can access the media content server 200 using a particular user account. In some embodiments, the user accounts 240 data store records settings for autoplay.

The taste profiles 242 contain records indicating media content tastes of users. A taste profile 242 can be associated with a user account and used to maintain an in-depth understanding of the music activity and preferences associated with a user account. Libraries and wrappers can be accessed to create taste profiles from a media library of the user account, social website activity and other specialized databases to mine music preferences.

In some embodiments, each taste profile 242 is a representation of media consumption activities. The media consumption activities can include a wide range of information such as artist plays, song plays, skips, dates of listen, songs per day, playlists, play counts, start/stop/skip data for portions of a song or album, contents of collections, rankings, preferences, or other mentions received via a client device, or other media plays, such as websites visited, book titles, movies watched, playing activity during a movie or other presentations, ratings, or terms corresponding to the media, such as "comedy", "sexy", etc. In addition, the taste profiles 242 can include other information. For example, the taste profiles 242 can include libraries and/or playlists of media content items associated with the user account.

The taste profiles 242 can be used for a number of purposes. One use of taste profiles is for creating personalized playlists (e.g., personal playlisting). An API call associated with personal playlisting can be used to return a playlist customized to a particular user account. For example, the media content items listed in the created playlist are constrained to the media content items in a taste profile associated with the particular user account.

Yet another use case is for personalized recommendation, where the contents of a taste profile are used to represent an individual's taste. This API call uses a taste profile as a seed for obtaining recommendations or playlists of similar artists.

A taste profile 242 can represent a single user account or multiple users' accounts. Conversely, a single user account can have multiple taste profiles 242. For example, one taste profile can be generated in connection with media content play activity of a user account, whereas another separate taste profile can be generated for the same user account based on the selection of media content items and/or artists for a playlist.

The autoplay engine 202 includes a granular control module 116, an autoplay queue generator 118, and an autoplay settings data store 120. Each of these components operates in the same way as those in FIG. 2.

Figure 4:
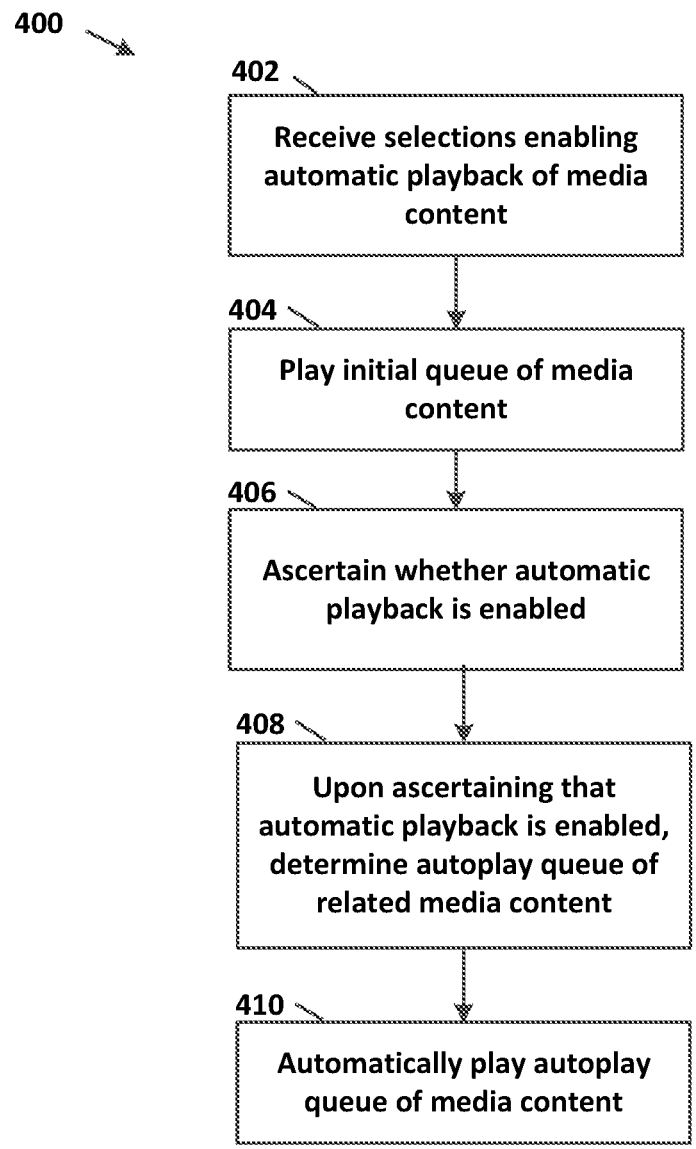
FIG. 4 is a flow diagram illustrating an example method of configuring automatic playback settings of media content.

FIG. 4 illustrates a flow diagram of an example method 400 of configuring automatic playback settings on a media playback device.

At operation 402, selections are received that enable automatic playback of media content. The selections can be received through the GUI 184 of FIG. 2. Inputs can be received through the user input device 130. Receiving selections of autoplay settings is further described in FIGS. 5-6.

At operation 404, an initial queue of media content is played. The initial queue of media content has a particular media context, such as a playlist, album, song, or artist. The first queue of media content includes at least one media content item such as a song. The first queue of media content is played through the media playback device 102 using a media content output device 140.

At operation 406, it is ascertained whether automatic playback is enabled. Automatic playback can be enabled or disabled generally, or particular settings can be applied to govern whether automatic playback will occur after an initial queue of media content concludes playback. The autoplay engine 114 in FIG. 2 or the autoplay engine 202 of FIG. 3 operates to ascertain whether automatic playback is enabled. This process is further described in FIGS. 7 and 9.

At operation 408, an autoplay queue of related media content is determined. This occurs upon ascertaining that automatic playback is enabled. The autoplay queue of related media content is determined by the autoplay queue generator 118 of FIG. 1 and/or FIG. 3. The autoplay queue can also be generated by the autoplay queue generator 192 of FIG. 2. The autoplay settings data store 120 includes selections of autoplay settings that can be accessed by the autoplay engine 114 to determine whether to generate an autoplay queue. Methods of determining the second or "autoplay" queue of media content are further described in FIGS. 19-20.

At operation 410, the autoplay queue of media content is automatically played. Again, the media in the autoplay queue of media content items is played through the media playback device 102 using the media content output device 140.

Figure 5:
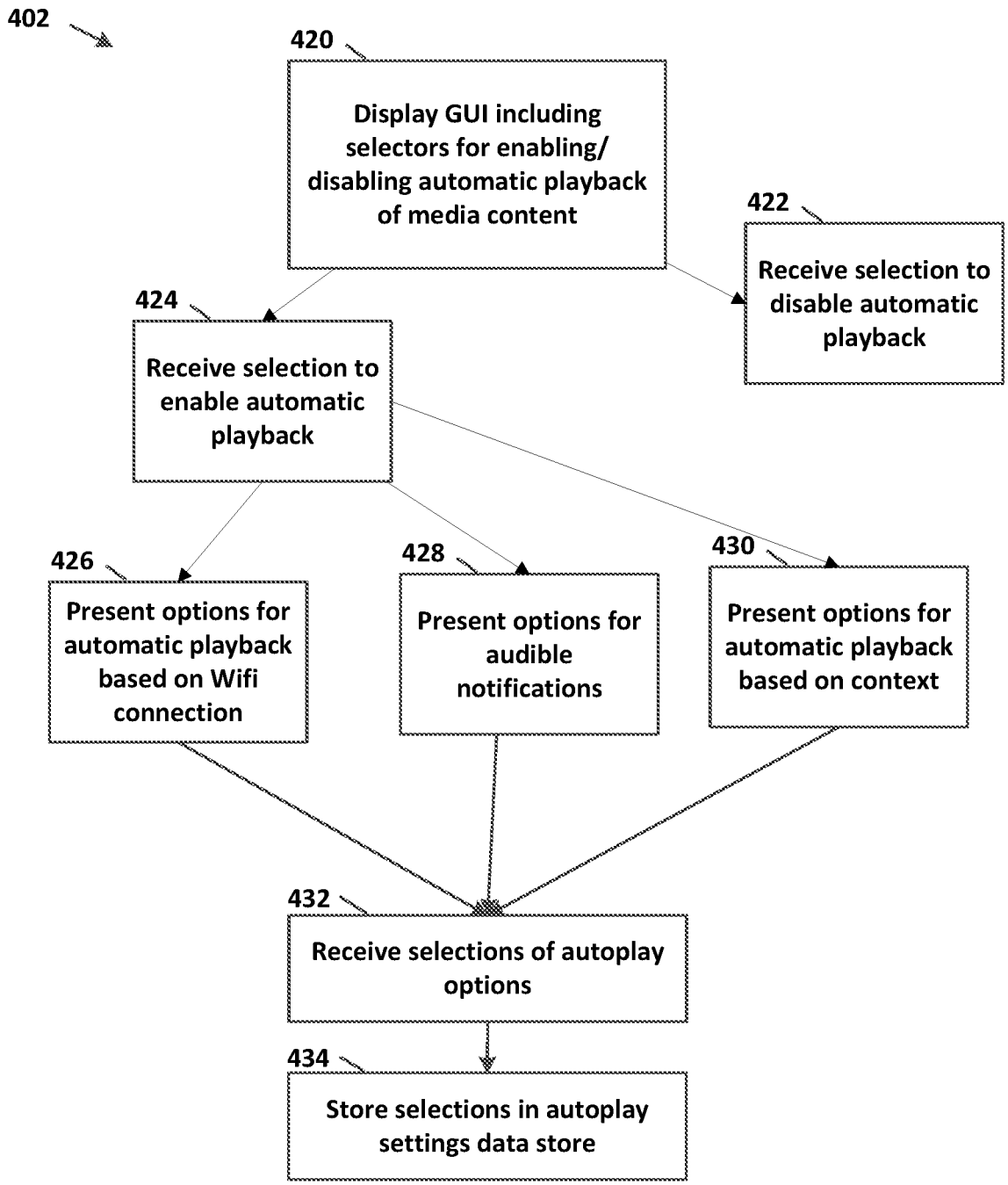
FIG. 5 is a flow diagram illustrating a detailed example method of receiving selections to adjust settings for automatic playback of media content.
Figure 6:
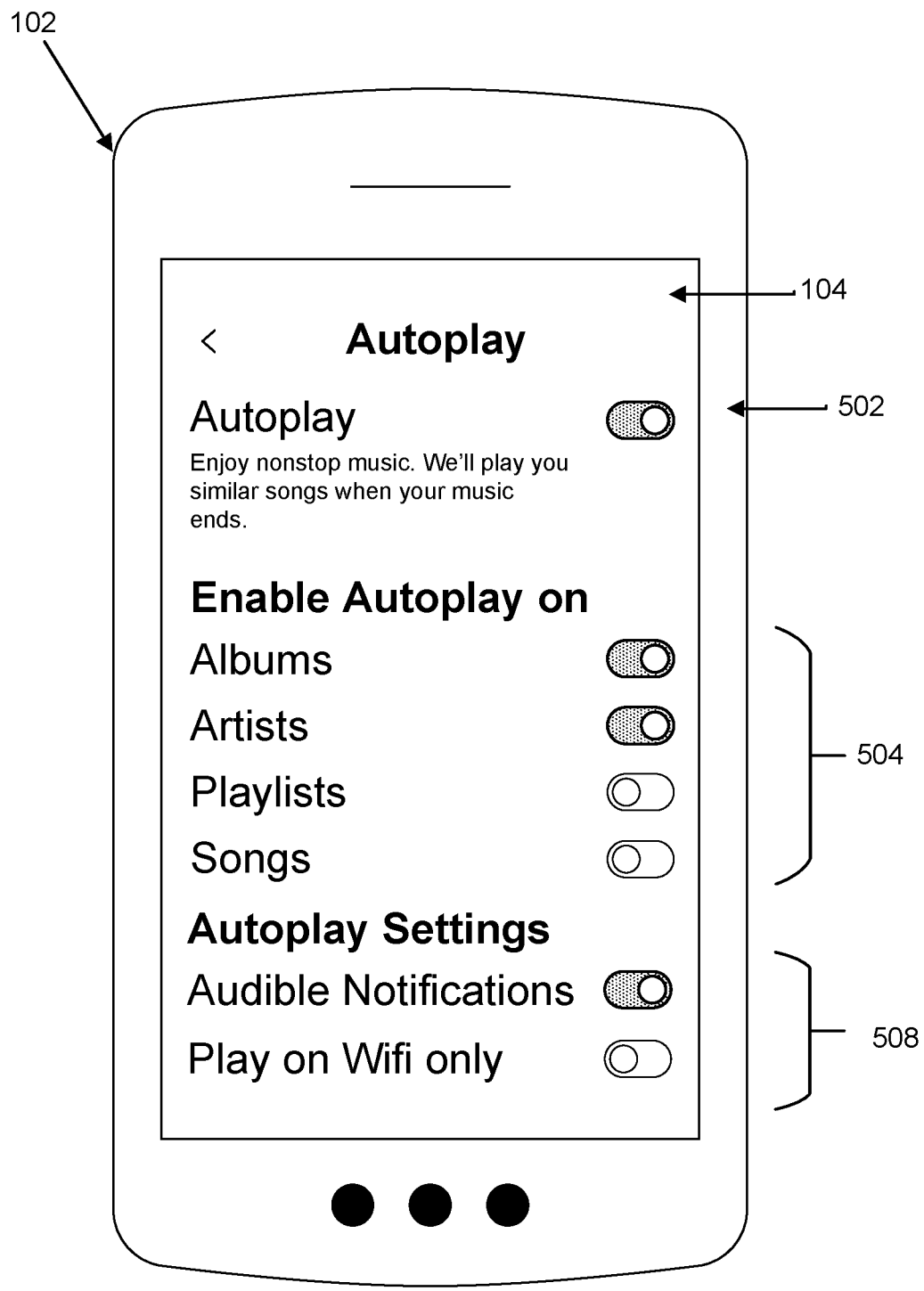
FIG. 6 illustrates an example display for configuring automatic playback settings of media content on a media playback device.

FIG. 5 illustrates a flow diagram of a method 402 of receiving selections to adjust settings for automatic playback of media content. At operation 420, a GUI including selectors for enabling or disabling automatic payback of media content is displayed. The GUI is displayed on a display device 132 of the media playback device 102 of FIG. 2. The GUI 184 is part of the media playback application 182. An example display of the GUI is shown in FIG. 6.

At operation 422, a selection is received to disable automatic playback. This disables automatic playback of media content in any situation. In some embodiments, the GUI will hide any other autoplay options if the automatic playback switch is disabled. In other embodiments, the GUI will disable the other autoplay option toggles when automatic playback is disabled, but they will remain visible on the GUI.

At operation 424, a selection is received to enable automatic playback. The selection can be received as input to actuate a toggle selector. In some embodiments, enabling autoplay will prompt the GUI to present additional options for automatic playback. Examples of such options are described in operations 426, 428, and 430.

Selections of additional autoplay settings are received through a user input device 130 of the media playback device 102 of FIG. 2. The user input device 130 can receive manual input 154 through a manual input device 160. An example of a manual input device 160 is a touch screen.

At operation 426, options are presented for automatic playback based on Wifi connection. A selector such as a toggle is presented which a user can enable or disable. When the selector is in a first state, autoplay will only initiate if the media playback device is connected to a WLAN. When the selector is in a second state, autoplay will initiate regardless of the type of data connection that is made.

At operation 428, options for audible notifications are presented on the GUI. In one embodiment, a user can opt to enable or disable an audible notification. The audible notification sounds before the autoplay queue of media content begins to play.

Figure 10:
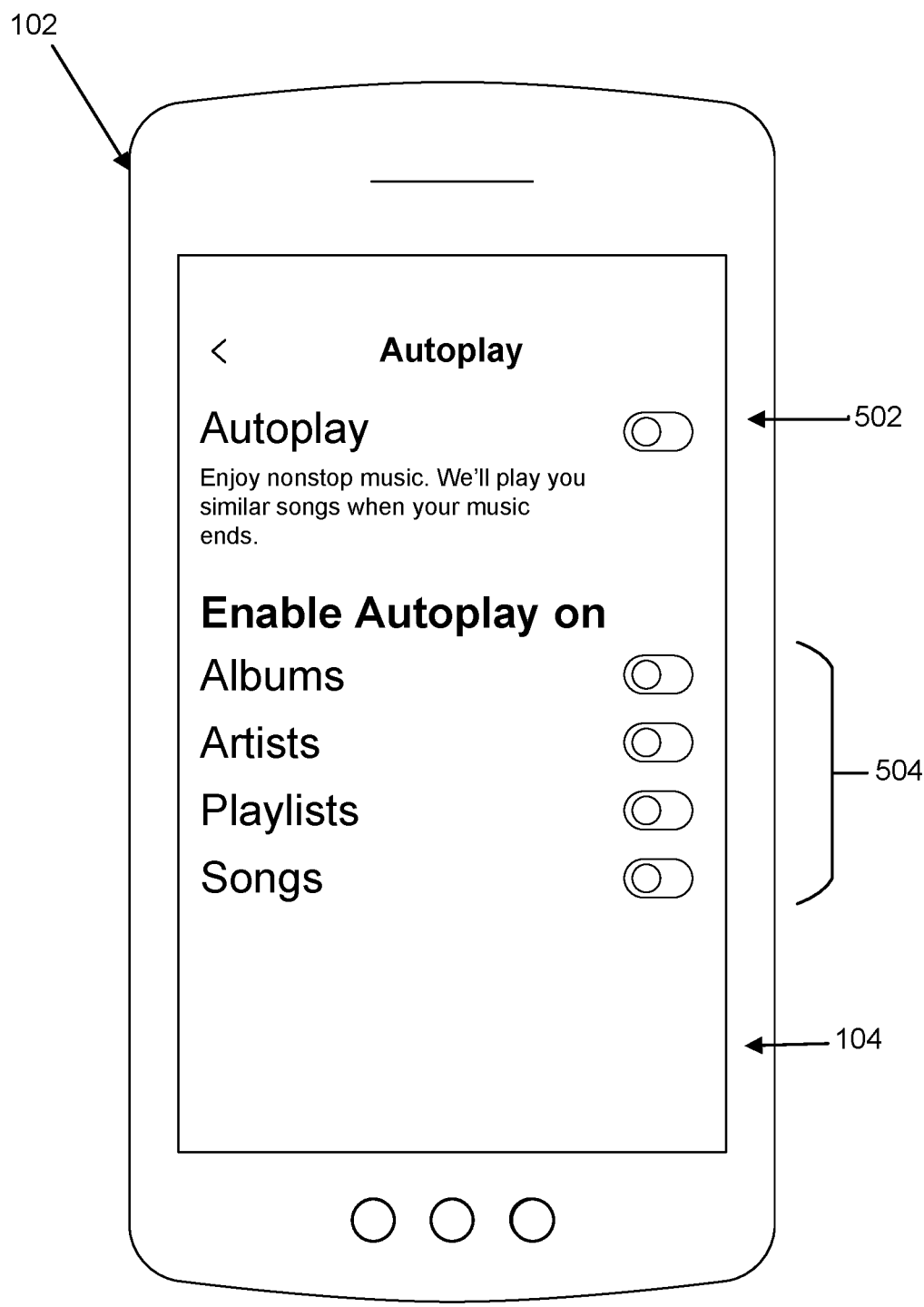
FIG. 10 illustrates an example display presented on a media playback device for configuring automatic playback settings.

At operation 430, options for automatic playback based on context are presented. A user can choose to enable autoplay only for certain contexts. For example, a user could choose that only when the initial queue is an album or a playlist will autoplay initiate after the initial queue concludes playback. Toggle selectors for each of a plurality of contexts can be displayed to allow for more granularity to be selected for autoplay. Example toggle selectors are shown in FIG. 10.

At operation 432, selections of autoplay options are received. Inputs are received through the GUI to select one or more autoplay options to fine tune the autoplay experience.

At operation 434, the selections are stored in a memory device. In some embodiment, these selections can be stored in the autoplay settings data store 120. In other embodiments, the selections can be stored in with user accounts 240.

FIG. 6 illustrates an example display 104 presented on a media playback device 102 for configuring automatic playback settings. A GUI is shown on the display 104 entitled "Autoplay." To reach this view, a selection for "Settings" may have been received followed by a selection for "Autoplay Settings."

An autoplay selector 502 is shown at the top of the display 104. In this example, an explanation of Autoplay is provided. The autoplay selector 502 is shown as being disabled or off. The selector is positioned to the left and the selector is darkened. The selector could be lightened if the background was white or a lighter color instead of black. In other examples, the autoplay selector 502 could be positioned at other locations of the display. The selector could be replaced with other graphical controls or selectors to indicate whether the autoplay feature is enabled or disabled.

Below the autoplay selector 502 is a series of context selectors 504. The context selectors 504 can be enabled or disabled to provide a level of granularity to the autoplay selections. In the example of FIG. 6, there are four context selectors 504. The "album" selector can be selected to enable autoplay when the media playback device is playing a particular album. The "artists" selector can be selected to enable autoplay when the media playback device is playing media content by a particular artist. The "playlists" selector can be selected to enable autoplay when the media playback device is playing a particular playlist. The "songs" selector can be selected to enable autoplay when the media playback device is playing a particular song. In FIG. 6, the selector for "Playlists" is disabled. This is indicated with a darkened selector color and a position of the selector to the left.

Below the context selectors 504 are additional autoplay settings selectors 508. The autoplay settings selectors 508 can be used to enable or disable different autoplay features. In the example of FIG. 6, the autoplay settings selectors 508 control audible notifications and data savings features. These features are described in further detail with respect to FIGS. 13-16

In the example of FIG. 6, the context selectors 504 and autoplay settings selectors 508 are displayed in a vertical arrangement below the autoplay selector 502. In some embodiments, the context selectors 504 and autoplay settings selectors 508 can be displayed in other positions relative to the autoplay selector 502. In some embodiments, the context selectors 504 and autoplay settings selectors 508 are not displayed if autoplay is disabled. In other embodiments, the context selectors 504 and autoplay settings selectors 508 are dimmed or lightened to deemphasize their appearance if the autoplay selector 502 is disabled.

Figure 7:
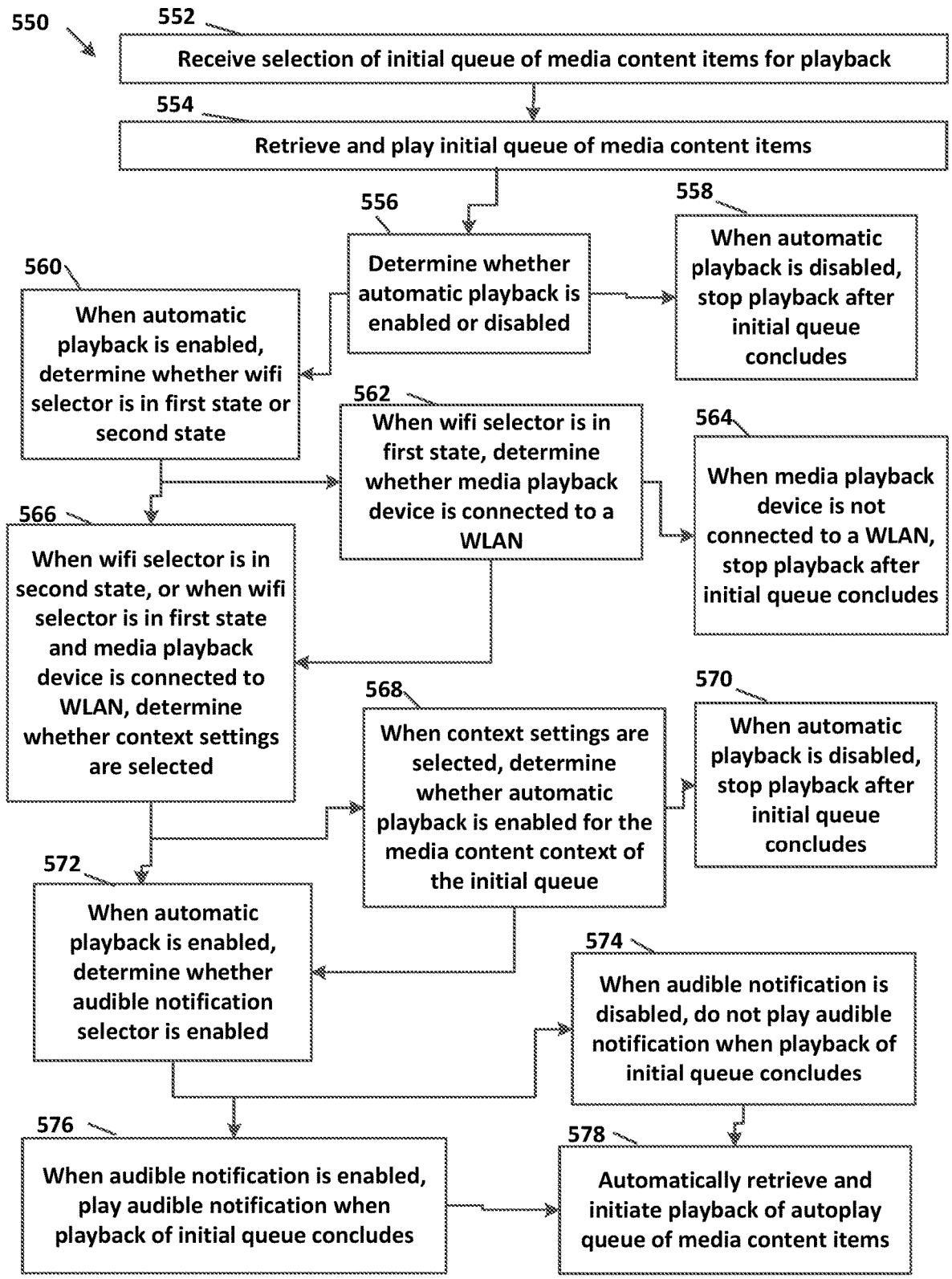
FIG. 7 illustrates a flow diagram of an example method of playing media content items on a media playback device.

FIG. 7 illustrates a flow diagram of an example method 550 of playing media content items on a media playback device. In some embodiments, media content is played automatically based on autoplay settings selected by a user of a media playback device.

At operation 552, an initial selection of a queue of media content items is received for playback. The selection can be received through the GUI of FIG. 2. Inputs can be received through the user input device 130. The initial queue can be any grouping of media content items such as a playlist, an album, or other collection of media content items.

At operation 554, the initial queue of media content is retrieved and played. The first queue of media content includes at least one media content item such as a song. The media content items are retrieved from the media content server. The first queue of media content is played through the media playback device 102 using a media content output device 140.

At operation 556, it is determined whether automatic playback is enabled or disabled. The autoplay engine 114 operates to ascertain whether automatic playback is enabled. A user can actuate the autoplay switch 190 to control whether automatic playback is enabled. In some embodiments, automatic playback can also be controlled in a settings menu for a media streaming service. In some embodiments, autoplay is automatically enabled by default. In other embodiments, autoplay is automatically disabled by default. To change from the default setting, the user must select a control to disable or enable autoplay. Examples of autoplay selectors are shown in FIG. 6.

Operation 558 occurs when automatic playback is disabled. Playback of media content stops after the initial queue of media content items concludes playing.

When automatic playback in enabled, the method proceeds to operation 560. It is determined whether a wifi selector is in a first state or a second state. The wifi selector can be one of the selectors displayed on the GUI described in FIG. 6. The selection made with the wifi selector can be stored in an autoplay setting data store such as the autoplay settings data store 120 of FIG. 1.

When the wifi selector is in the first state, the method proceeds to operation 562. It is then determined whether the media playback device is connected to a WLAN. This can be performed with the wifi control module 124.

When the media playback device is not connected to a WLAN, the method proceeds to operation 564. Playback stops after the initial queue concludes—no autoplay queue plays.

When the wifi selector is in the second state, or when the wifi selector is in the first state but the media playback device is connected to WLAN, the method proceeds to operation 566. At this point, it is determined whether context settings are selected. The context settings provide granularity to automatic playback based on the type of media content context of the initial queue.

At operation 568, context settings are selected. It is then determined whether automatic playback is enabled for the media content context of the initial queue. The process for determining this is described in further detail with respect to FIG. 8.

At operation 570, it is determined that automatic playback is disabled with the particular media content context of the initial queue. Playback stops after the initial queue concludes. No audible notification is played.

The method proceeds to operation 572 when automatic playback is enabled for the media content context of the initial queue or when context settings are not selected. The audible notification module 122 determines whether the audible notification selector is enabled. The audible notification selector settings can be stored in the autoplay settings data store 120.

The method proceeds to operation 574 when the audible notification is disabled. When playback of the initial queue concludes, an audible notification will not be played.

The method proceeds to operation 576 when the audible notification is enabled. When playback of the initial queue concludes, an audible notification will be played.

Finally, at operation 578, an autoplay queue of media content items is automatically retrieved and playback of the queue is initiated.

Figure 8:
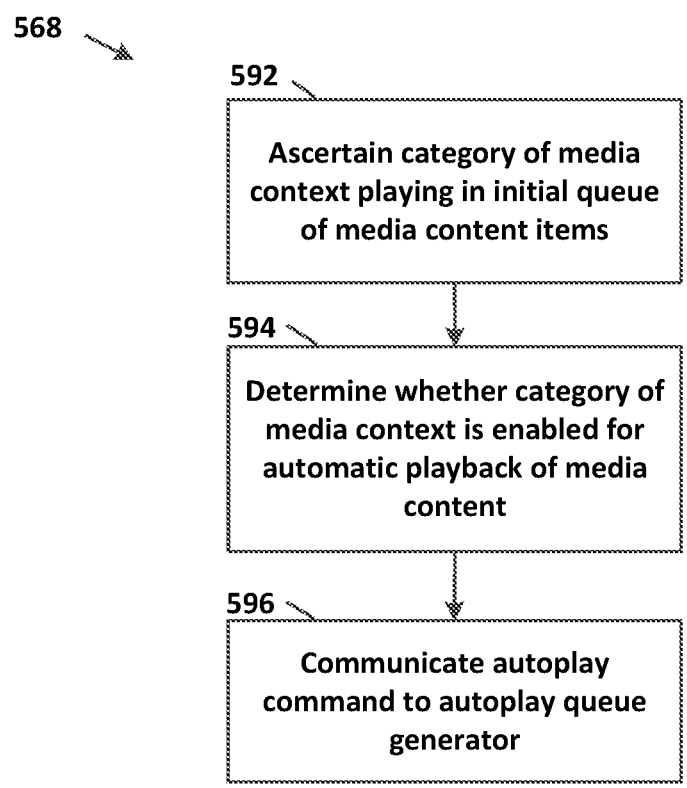
FIG. 8 is a flow chart of an example method of ascertaining whether automatic playback is enabled for the media content context of the first queue.

FIG. 8 is a flow chart of an example method 568 of ascertaining whether automatic playback is enabled for the media content context of the first queue.

At operation 592, the category of media context playing in the first, or initial, queue of media content items is ascertained. In some embodiments, this step is performed by the granular control module 116 of the autoplay engine 202.

At operation 594, it is determined whether the category of media context is enabled for automatic playback of media content. The granular control module 116 accesses the autoplay settings data store 120 to determine whether the context is enabled for autoplay. The granular control module 116 may access data in the form of a table, such as the example table displayed in FIG. 9.

At operation 596, an autoplay command is communicated to the autoplay queue generator 192 if the category of media context of the initial queue is enabled for autoplay.

FIG. 9 illustrates an example data table 600 that could be referenced by the granular control module. Each context 610 is recorded with a context name 602 and context ID 604. The context type 606 is also recorded. Finally, there is a column 608 indicating whether the context is enabled for autoplay. In this example, artists and playlists are enabled for autoplay while songs and albums are not. The contexts "Backyard BBQ" and "Classical Essentials" are enabled for autoplay because they are playlists. Similarly, contexts "Skrillex" and "Wiz Khalifa" are enabled for autoplay because they are artists. Contexts "This Is Acting" and "Focus" are not enabled for autoplay because they are an album and a song, respectively.

FIG. 10 illustrates an example display 104 presented on a media playback device 102 for configuring automatic playback settings. A GUI is shown on the display 104 entitled "Autoplay." To reach this view, a selection for "Settings" may have been received followed by a selection for "Autoplay Settings."

An autoplay selector 502 is shown at the top of the display 104. In some examples, the autoplay selector 502 could be positioned at other locations of the display. The selector could be replaced with other graphical controls or selectors to indicate whether the autoplay feature is enabled or disabled.

Below the autoplay selector 502 is a series of context selectors 504. The context selectors 504 can be enabled or disabled to provide a level of granularity to the autoplay selections. In the example of FIG. 10, there are four context selectors 504. The "album" selector can be selected to enable autoplay when the media playback device is playing a particular album. The "artists" selector can be selected to enable autoplay when the media playback device is playing media content by a particular artist. The "playlists" selector can be selected to enable autoplay when the media playback device is playing a particular playlist. The "songs" tog selector gle can be selected to enable autoplay when the media playback device is playing a particular song. In FIG. 10, all of the context selectors 504 are disabled. Similar to the autoplay toggle 502, this is indicated with a position of the selector to the left. In the example of FIG. 10, the context selectors 504 are displayed in a vertical arrangement below the autoplay toggle 502.

Figure 11:
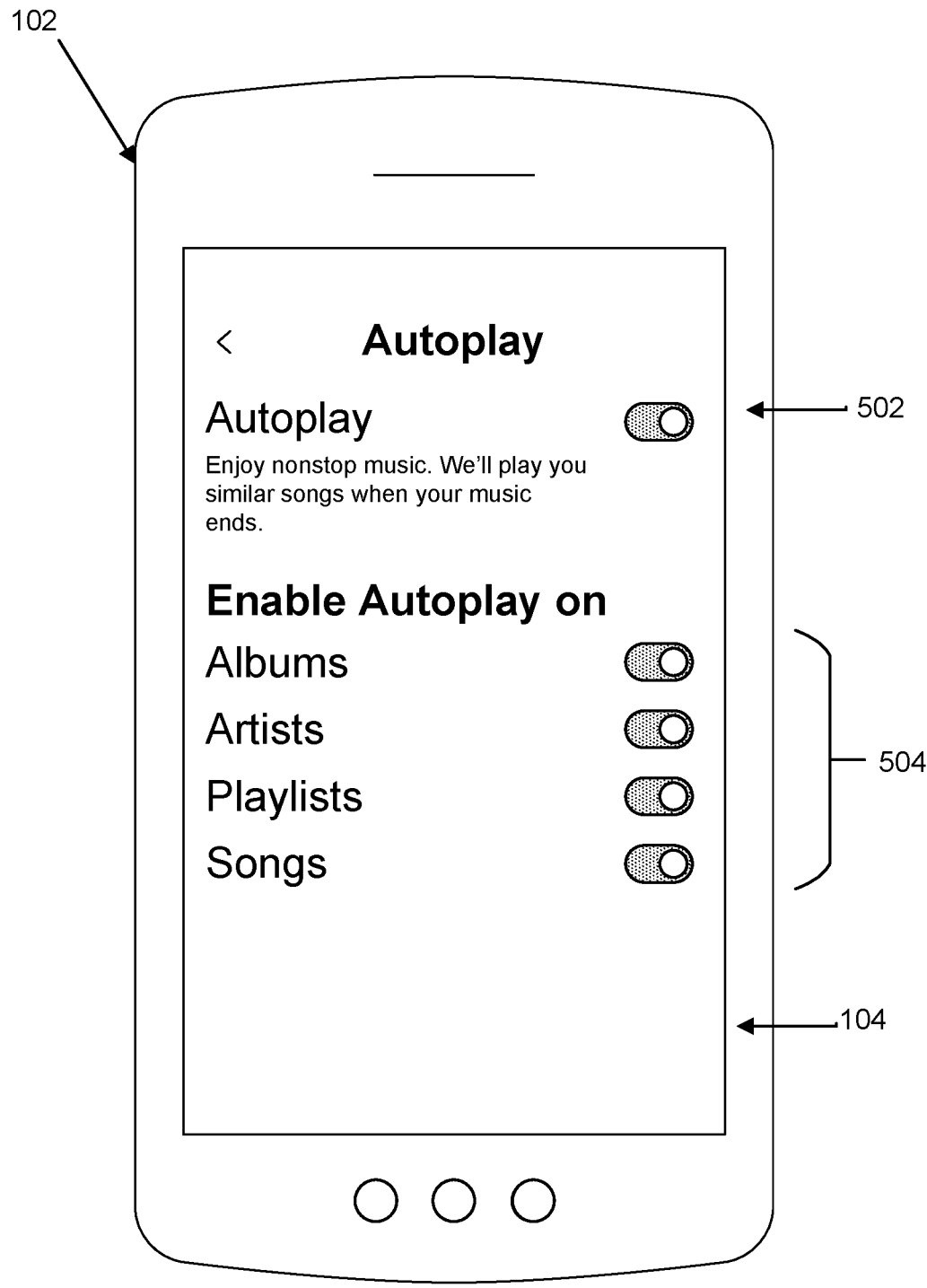
FIG. 11 illustrates another view of the display on the media playback device.

FIG. 11 shows another view of the display 104 on the media playback device 102 after the autoplay selector 502 has been selected to enable autoplay. The autoplay selector 502 is shown as a toggle being moved to the right and highlighted, indicating that it is enabled. Additionally, all of the context selectors 504 are shown as being enabled in the same way. In this example, selecting the autoplay selector 502 enables autoplay for every context. If a user desires to disable autoplay for a particular media context, the user selects a context selector 504 to disable autoplay for that context. In other examples, the context selector 504 may need to be individually enabled.

Figure 12:
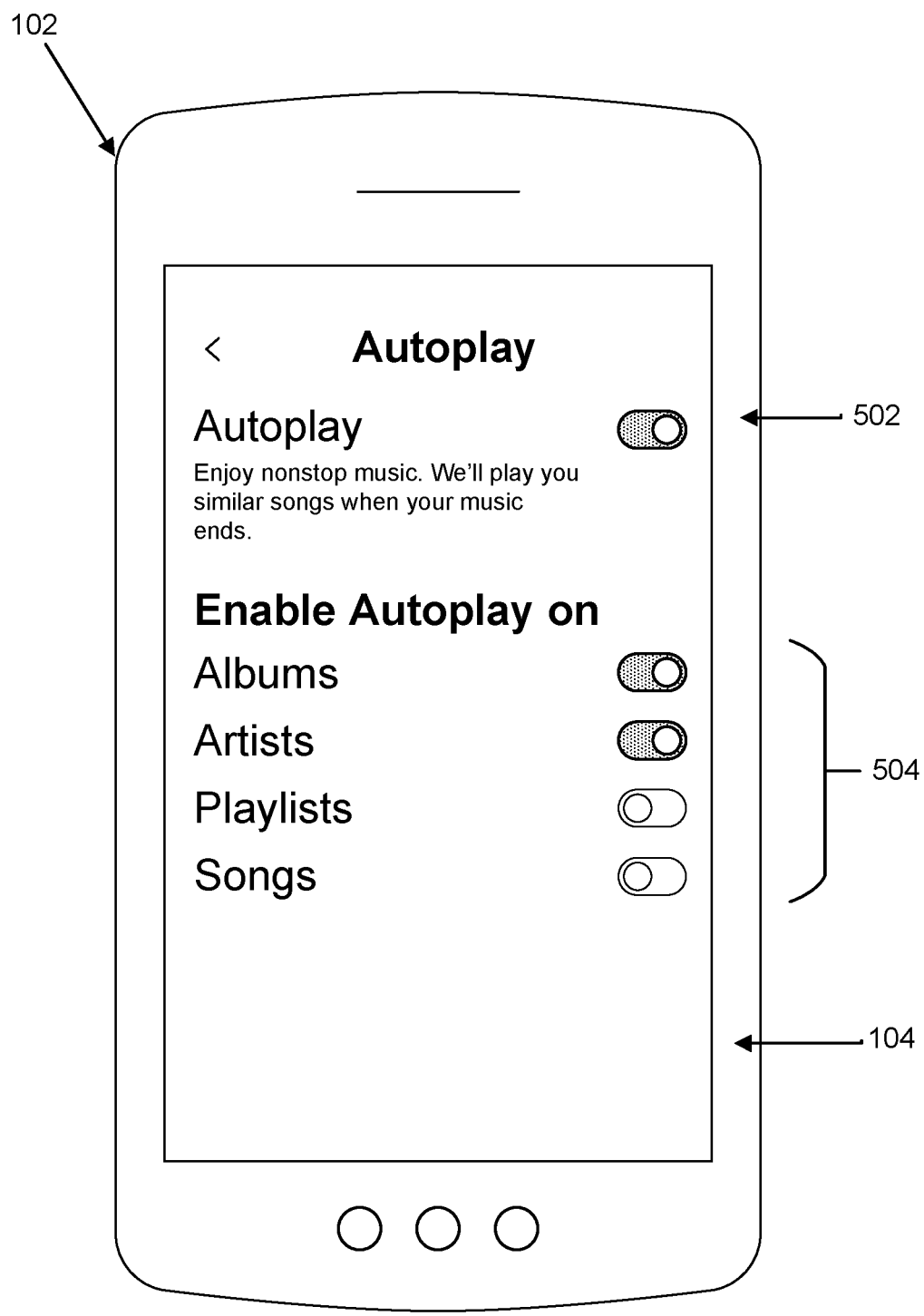
FIG. 12 illustrates another view of the display on the media playback device.

FIG. 12 shows another view of the display 104 on the media playback device 102 after individual context selectors 504 have been disabled. In this example, selections have been received to disable the "Playlists" and "Songs" context selectors 504. Thus, automatic playback of an autoplay queue will only commence after an initial queue of media content has concluded if the initial queue is an album or an artist.

Figure 13:
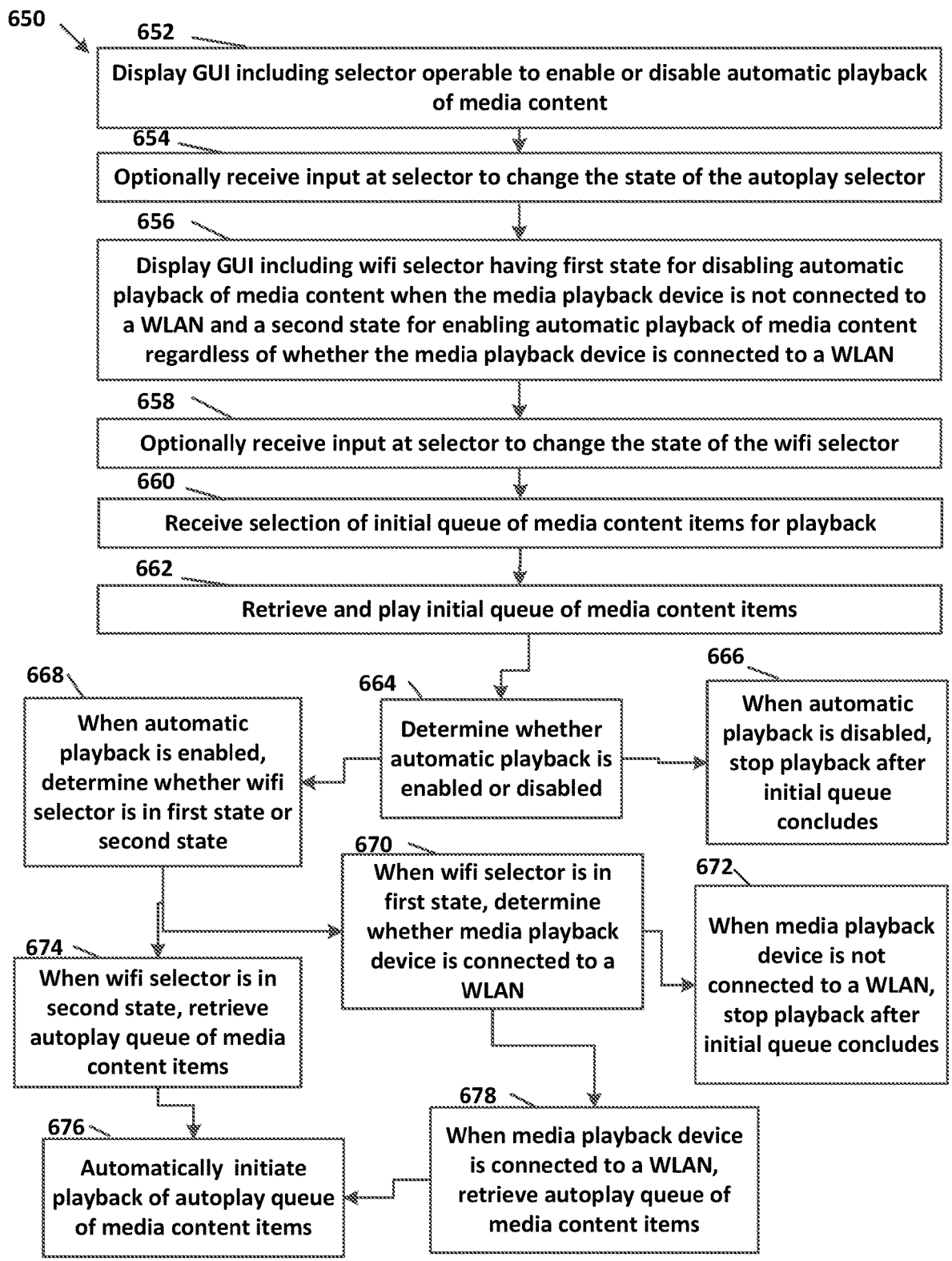
FIG. 13 illustrates a method of customizing playback of media content items one a media playback device.

FIG. 13 illustrates a method 650 of customizing playback of media content items on a media playback device. In some embodiments, the method 650 is performed by a media playback device 102, such as a smart phone or tablet computer. Some steps of the method 650 are optional. Different features can be enabled or disabled in an autoplay settings menu.

At operation 652, a graphical user interface is displayed on the media playback device. The GUI includes a selector operable to enable or disable automatic playback of media content items. In some embodiments, the selector is displayed on a settings menu, such as the menu shown in FIG. 6. In some embodiments, the selector for enabling or disabling automatic playback is a playback switch displayed on a media control GUI, such as FIG. 17. The playback switch is displayed as a selectable icon. In some embodiments, the selectable icon has a lemniscate shape. The GUI can also include other elements that can be selected or actuated by user to control playback of media content. For example, the GUI can include icons that can be selected to initiate playback of a media content queue, pause playback, skip to the next media content item, or select a different media content queue.

At operation 654, input is optionally received at the selector to enable or disable automatic playback. In some embodiments, autoplay is enabled by default. In other embodiments, autoplay is disabled by default. Actuating the selector changes the status of autoplay between enabled and disabled. The selection is saved in an autoplay settings data store 194.

At operation 656, a selector is displayed on a GUI that has a first state for disabling automatic playback of media content when the media playback device is not connected to a WLAN and a second state for enabling automatic playback of media content regardless of whether the media playback device is connected to a WLAN. This selector is useful to customize automatic playback options to save data if the media playback device is connected to a wireless network that charges for the amount of data that is being used. However, a WLAN connection is likely to be free of charge, so if the user wants to avoid streaming additional content after an initial queue of media content has concluded playback, the user can select to enable autoplay only when a WLAN connection is present. In some embodiments, this selector is displayed on a GUI at the same time as the selector for automatic playback. For example, in a settings menu, such as the settings menu displayed in FIG. 15, there is a selector 502 for enabling or disabling autoplay as well as a selector 730 for enabling or disabling audible notification. In some embodiments, a selector for enabling or disabling audible notifications will only be displayed when the selector for autoplay is enabled.

At operation 658, input is optionally received at the selector to change the state of the selector. In some embodiments, the selector will be set to the first state by default, to save on data charges. User input would be required to allow for autoplay to engage even when there is not a WLAN connection. In some embodiments, the selector will be set to the second state by default, to enable as much media content to be played automatically as possible. In that embodiment, user input would be required to turn off the autoplay feature when there is not a WLAN connection. The current state of the selector is saved in the autoplay setting data store 194.

At operation 660, an initial selection of a queue of media content items is received for playback. The selection can be received through the GUI 184 of FIG. 2. Inputs can be received through the user input device 130. The initial queue can be any grouping of media content items such as a playlist, an album, or other collection of media content items. In some embodiments, the initial queue consists of a single track.

At operation 662, the initial queue of media content is retrieved and played. The initial queue of media content includes at least one media content item such as a song. The media content items are retrieved from the media content server 200. The first queue of media content is played through the media playback device 102 using a media content output device 140.

At operation 664, it is determined whether automatic playback is enabled or disabled. The autoplay engine 114 operates to ascertain whether automatic playback is enabled. The autoplay engine 114 accesses the autoplay settings data store 120 to determine the current state of the autoplay switch 188.

Operation 666 occurs when automatic playback is disabled. Playback of media content stops after the initial queue of media content concludes playing.

Operation 668 occurs when automatic playback is enabled. It is determined whether the wifi selector is in the first state or the second state. Operation 668 occurs some time before the initial queue of media content concludes playing. In some embodiments, operation 668 occurs multiple times while the initial queue is playing in case the wifi selector setting is changed during playback. The Wifi control module 124 operates to ascertain whether the wifi selector is in the first state or the second state. A user can actuate the selector to enable or disable a feature that will only allow playback of an autoplay queue of media content when the media playback device is connected to a WLAN.

When the wifi selector is in the first state, the method proceeds to operation 670. It is determined whether the media playback device is connected to a WLAN. The wifi control module 124 of FIG. 1 or the wifi control module 198 of FIG. 2 operates to determine whether the wireless data communication device 134 is connected to WLAN or not.

When the media playback device is not connected to a WLAN, the method proceeds to operation 672. Playback will stop after the initial queue of media content concludes playback. A user will have to interact with a GUI to initiate playback of additional media content items in order to keep playing media content on the media playback device 102.

When the wifi selector is in the second state, the method proceeds to operation 674. When the wifi selector is in the first state and the media playback device is connected to a WLAN, the method proceeds to operation 678. In both instances, an autoplay queue of media content items is automatically retrieved. The autoplay queue of related media content is determined by the autoplay queue generator 192 of FIG. 2 and/or autoplay queue generator 118 of FIG. 3. If the user selects from two or more autoplay queue options, the selected autoplay queue is retrieved. After the initial queue of media content items concludes playing, the autoplay queue is played. This provides a continuous, uninterrupted stream of media playback. Methods of determining the second or "autoplay" queue of media content are further described in FIG. 19.

After operations 674 or 678, the method proceeds to operation 676. Media content items in the autoplay queue automatically play immediately after the last media content item in the initial queue has concluded playing. The user of the media playback device 102 does not have to take additional action to choose additional media content to play or to prompt the media playback device to continue playing more media content.

Figure 14:
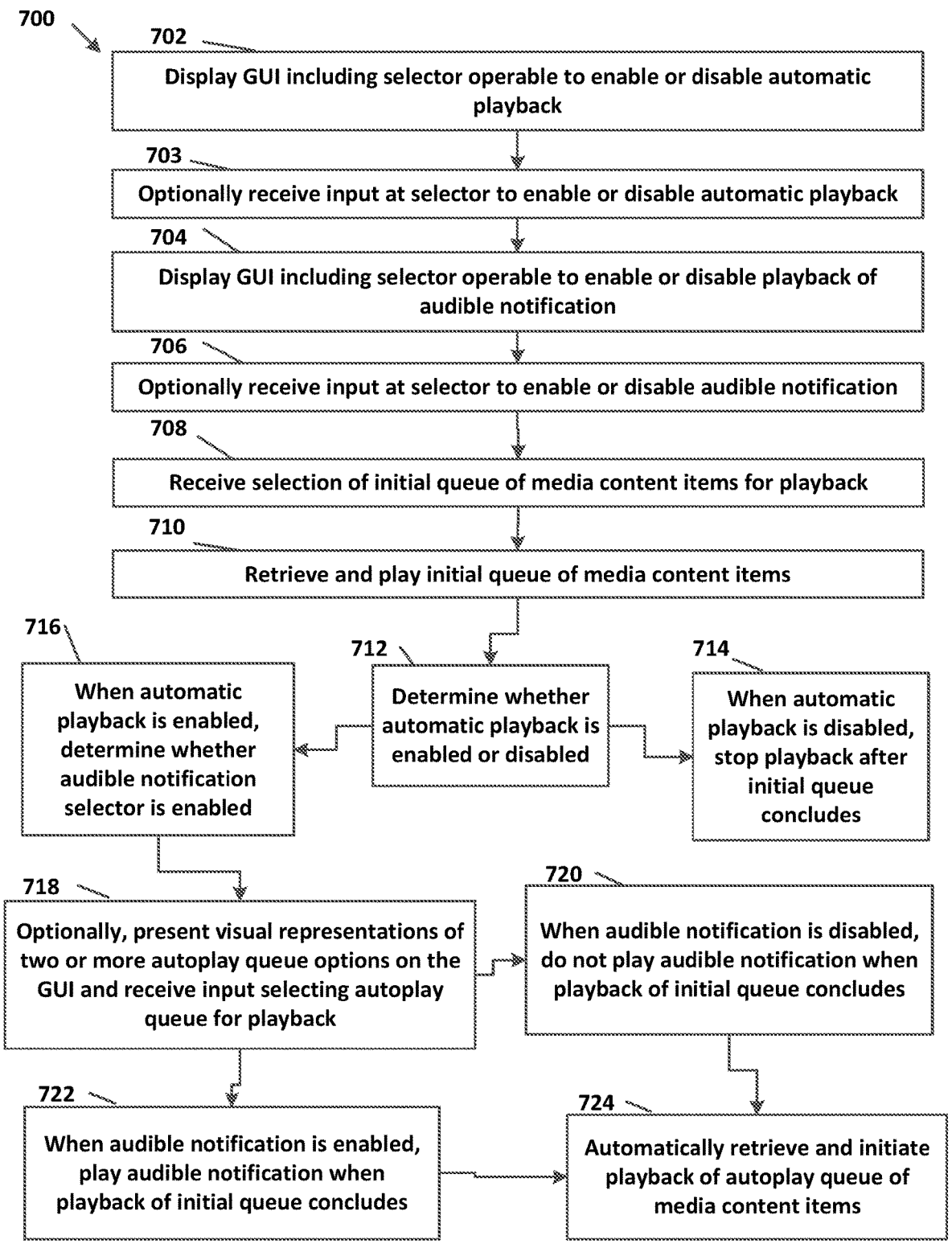
FIG. 14 illustrates a method of customizing playback of media content items one a media playback device.

FIG. 14 illustrates a method 700 of customizing playback of media content items on a media playback device. In some embodiments, the method 700 is performed by a media playback device 102, such as a smart phone or tablet computer. Some steps of the method 700 are optional. Different features can be enabled or disabled in an autoplay settings menu.

At operation 702, a graphical user interface is displayed on the media playback device. The GUI includes a selector operable to enable or disable automatic playback of media content items. In some embodiments, the selector can be displayed on a settings menu. In some embodiments, the selector is displayed on a main view of the GUI alongside media playback controls.

At operation 703, input is optionally received at the selector to enable or disable automatic playback. In some embodiments, autoplay is enabled by default. In other embodiments, autoplay is disabled by default. Actuating the selector changes the status of autoplay between enabled and disabled.

At operation 704, a selector is displayed operable to enable or disable playback of audible notifications. In some embodiments, this selector is displayed on a GUI at the same time as the selector for automatic playback. In some embodiments, a selector for enabling or disabling audible notifications will only be displayed when the selector for autoplay is enabled.

At operation 706, input is optionally received at the audible notification selector to enable or disable audible notifications. The audible notifications will sound when an initially selected queue of media content items ends and an automatically selected queue of media content items begins. The audible notification marks the transition between media content selected by the user and media content automatically selected for the user. A user can opt to disable such audible notifications. In some embodiments, the audible notifications are enabled by default. In other embodiments, the audible notifications are disabled by default. In some embodiments, the user can choose a preference for audible tones, melodies, verbal announcements, and a silent, visual notification.

At operation 708, an initial selection of a queue of media content items is received for playback. The selection can be received through the GUI 184 of FIG. 2. Inputs can be received through the user input device 130. The initial queue can be any grouping of media content items such as a playlist, an album, or other collection of media content items. In some embodiments, the initial queue consists of a single track.

At operation 710, the initial queue of media content is retrieved and played. The initial queue of media content includes at least one media content item such as a song. The media content items are retrieved from the media content server 200. The first queue of media content is played through the media playback device 102 using a media content output device 140.

At operation 712, it is determined whether automatic playback is enabled or disabled. The autoplay engine 114 operates to ascertain whether automatic playback is enabled. A user can actuate the autoplay switch 190 to control whether automatic playback is enabled. In some embodiments, automatic playback can also be controlled in a settings menu for a media streaming service. In some embodiments, autoplay is automatically enabled by default. In other embodiments, autoplay is automatically disabled by default. To change from the default setting, the user must select a control to disable or enable autoplay.

Operation 714 occurs when automatic playback is disabled. Playback of media content stops after the initial queue of media content items concludes playing.

Operation 716 occurs when automatic playback is enabled. It is determined whether audible notifications are enabled or disabled. Operation 716 occurs some time before the initial queue of media content concludes playing. In some embodiments, operation 716 occurs multiple times while the initial queue is playing in case the audible notification setting is changed during playback. The audible notification module 194 operates to ascertain whether the audible notification is enabled.

Figure 23:
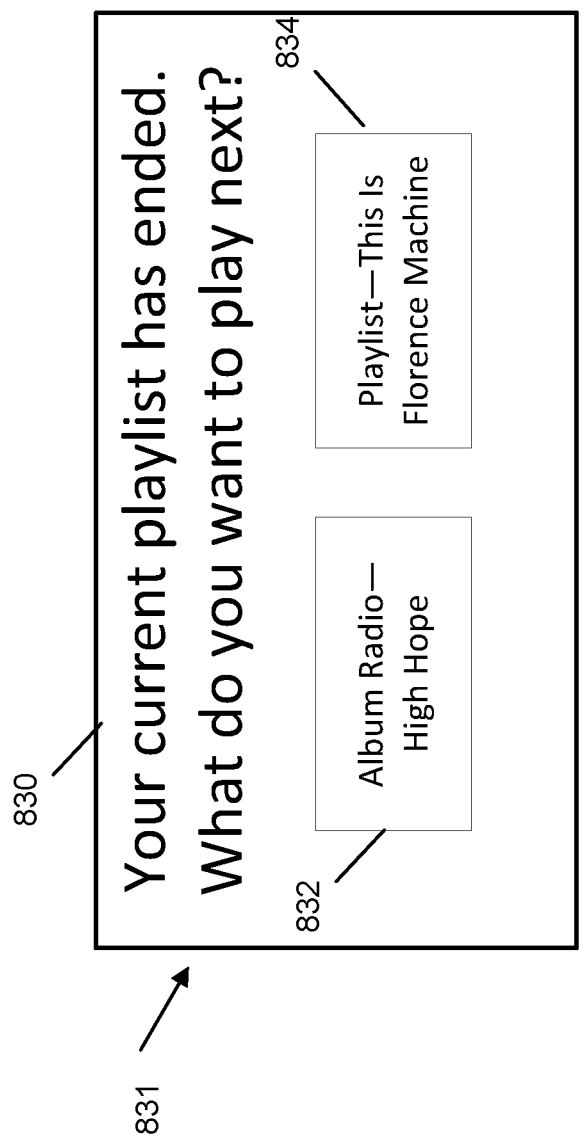
FIG. 23 illustrates a GUI that could be shown on the display device of the media playback device of FIG. 1.

In some embodiments, the method proceeds to operation 718. Operation 718 can occur at substantially the same time as operation 716, before the initial queue of media content concludes playback. In some embodiments, operation 718 occurs at substantially the same time that the initial queue of media content concludes playback. Visual representations of two or more autoplay queue options are displayed on a graphical user interface of a media playback device. For example, two playlist options could be displayed on the GUI 184 of the media playback device 102. FIG. 23 shows an example display offering the option of a playlist and radio station to be used for the autoplay queue. The two options are automatically generated by the autoplay queue generator 192. In some embodiments, three or more options are displayed. Input is received through the GUI 184 to select one of the options.

Operation 720 occurs when the audible notification is disabled. When playback of the initial queue of media content concludes, no audible notification is played.

Operation 722 occurs when the audible notification is enabled. When playback of the initial queue of media content concludes, an audible notification is played. The audible notification can be an alert sound that is brief in duration. For example, the alert sound could be less than 30 seconds, less than 20 seconds, less than 10 seconds, or less than 5 seconds in duration. Examples of such alert sounds include beeps, chirps, and chimes. Alternatively, a brief verbal announcement could be played. Such verbal announcement could be "Automatic playback will begin now," or "Autoplay Initiated!" or simply "autoplay." The verbal announcement could also announce the title of the autoplay queue or provide a description of the autoplay queue that will be played.

At operation 724, an autoplay queue of media content items is automatically retrieved. The autoplay queue of related media content is determined by the autoplay queue generator 192 of FIG. 2 and/or autoplay queue generator 118 of FIG. 3. If the user selects from two or more autoplay queue options, the selected autoplay queue is retrieved. After the initial queue of media content items concludes playing, the autoplay queue is played. This provides a continuous, uninterrupted stream of media playback. Methods of determining the second or "autoplay" queue of media content are further described in FIG. 19.

Media content items in the autoplay queue automatically play immediately after the last media content item in the initial queue has concluded playing. The user of the media playback device 102 does not have to take additional action to choose additional media content to play or to prompt the media playback device to continue playing more media content.

Figure 15:
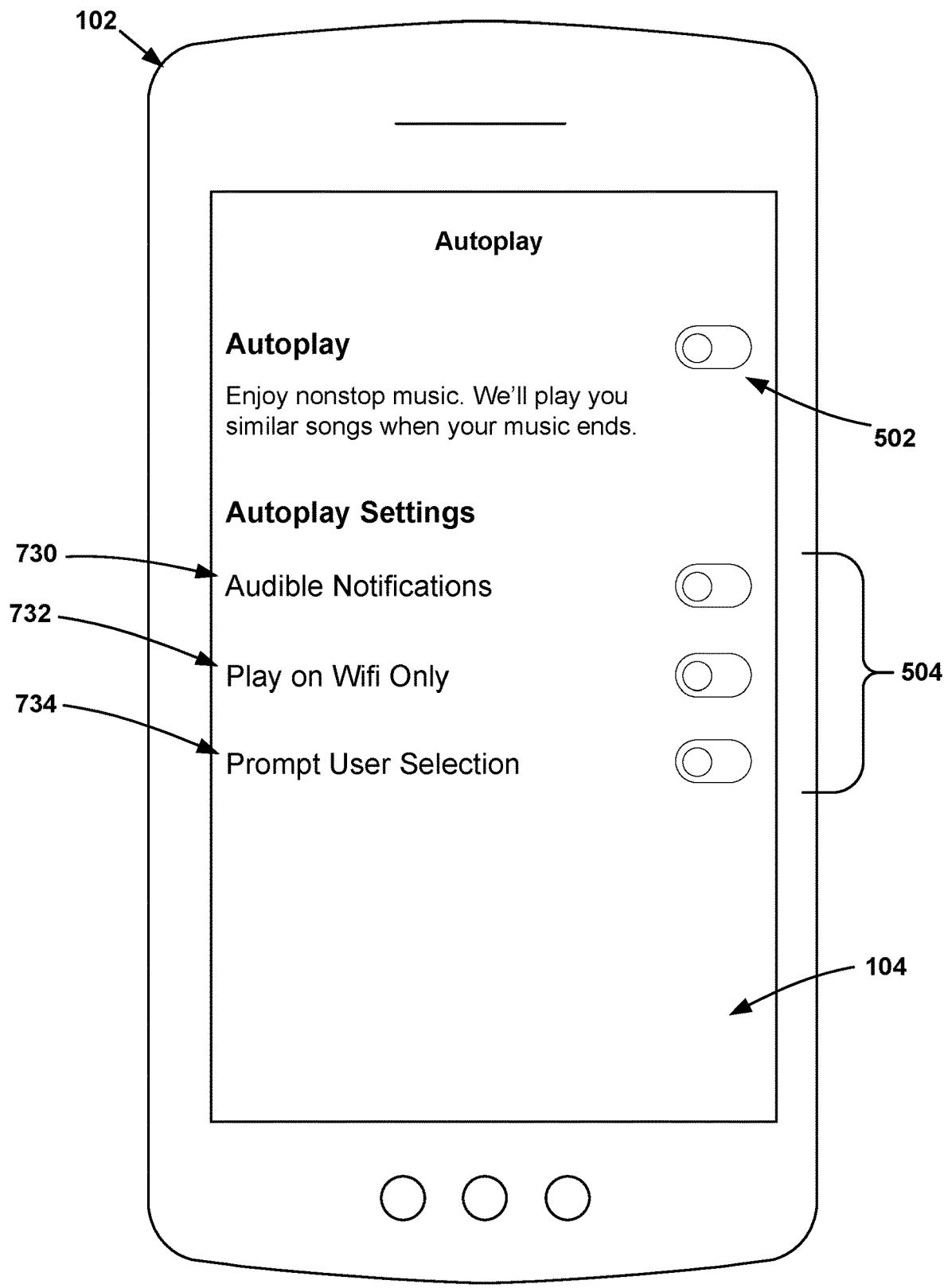
FIG. 15 illustrates an example display of a GUI on a media playback device.
Figure 16:
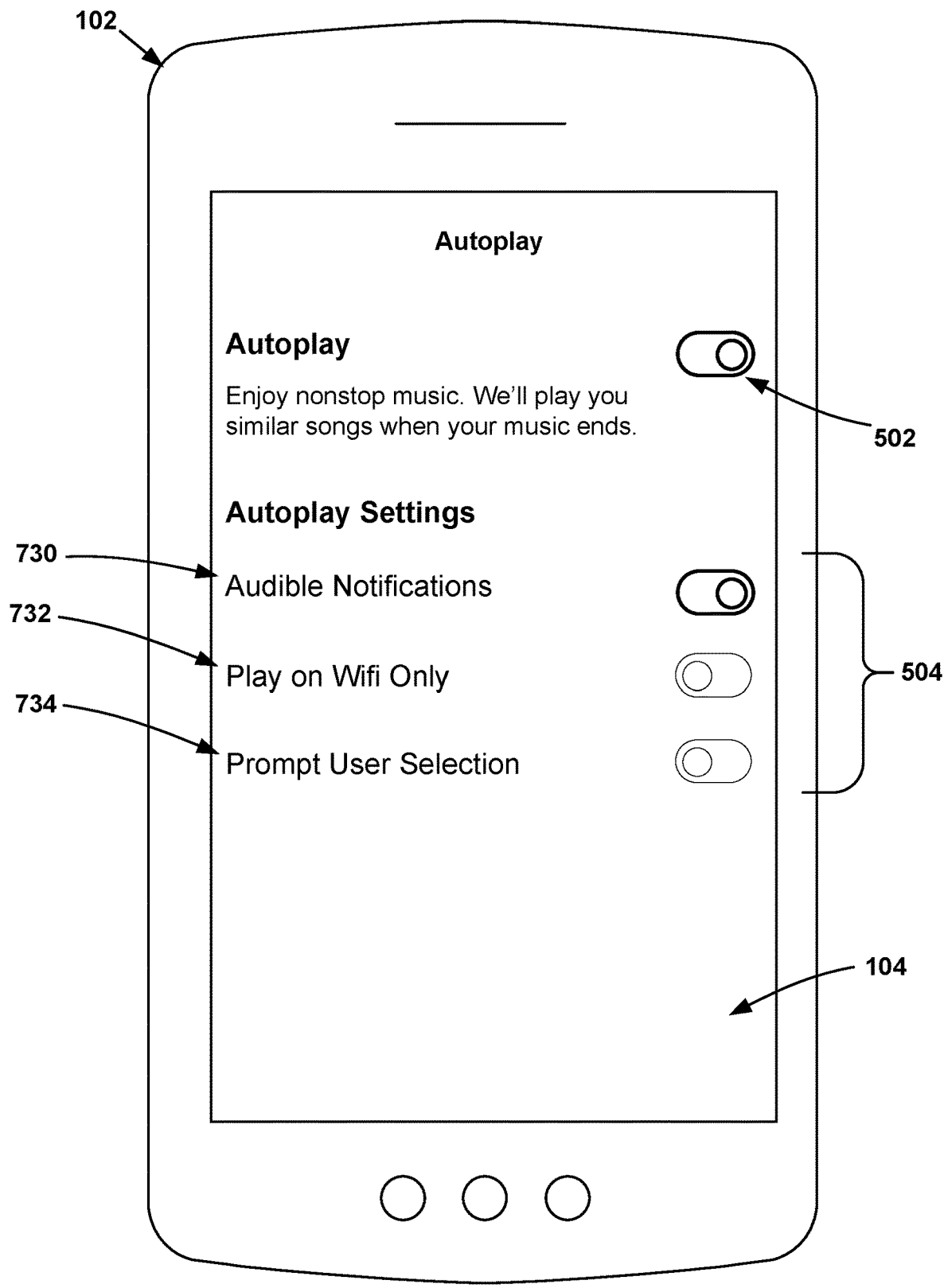
FIG. 16 illustrates an example display of a GUI on a media playback device.

FIGS. 15-16 illustrates an example display 104 presented on a media playback device 102. The display 104 is shown displaying a settings menu for controlling autoplay settings. An autoplay selector 502 can be actuated to enable or disable automatic playback of an autoplay queue of media content items after an initial queue of media content concludes playback. In the example of FIGS. 15-16, there are also selectors 508 for adjusting settings related to automatic playback of media content. These selectors include an audible notifications selector 730, a wifi selector 732, and a user selection selector 734.

In some embodiments, the autoplay selectors 508 are not displayed when the main autoplay selector 502 is disabled. In some embodiments, the autoplay selectors 508 are displayed, but cannot be selected when the main autoplay selector 502 is disabled. The selectors 508 can be displayed as actuatable toggles. Other visual representations of selectors are possible such as radio buttons, check boxes, and the like.

The audible notifications selector 730 can be actuated to enable or disable an alert sound that is played after an initial queue of media content concludes and an autoplay queue of media content is about to begin. In some embodiments, the audible notifications are enabled by default when autoplay is enabled. In some embodiments, options for specific types of audible notifications may be displayed when the audible notifications are enabled. For example, a user could select from options for tone, verbal, and silent notifications.

The wifi selector 732 can be actuated to enable or disable autoplay depending on whether there is a wifi connection. Autoplay can be disabled when there is not a wireless connection. Alternatively, autoplay could be enabled regardless of whether there is a wireless connection.

The "prompt user selection" selector 734 can be actuated to enable or disable a feature that displays two or more options for autoplay queues on the GUI 184. When the user selection selector 734 is enabled, a display of two or more autoplay queue options are presented on the media playback device 102. In some embodiments, this display will occur before the initial queue of media content concludes playback. In other embodiments, the display occurs after the initial queue concludes, but before other media content is automatically generated. In some embodiments, the options will displayed at the same time that an audible notification is played if the audible notifications are enabled. The display of options, in some embodiments, is displayed for a limited period of time and if no input of a selection is received, one of the autoplay queue options will be automatically selected and played. When the user selection selector 734 is disabled, no options are displayed and one autoplay queue is automatically selected for playback.

FIG. 15 shows the autoplay settings when autoplay is disabled. FIG. 16 shows the autoplay settings when autoplay is enabled. The audible notifications selector 730 is enabled, the wifi selector 732 is not selected, and the user selection selector is disabled 734.

Figure 17:
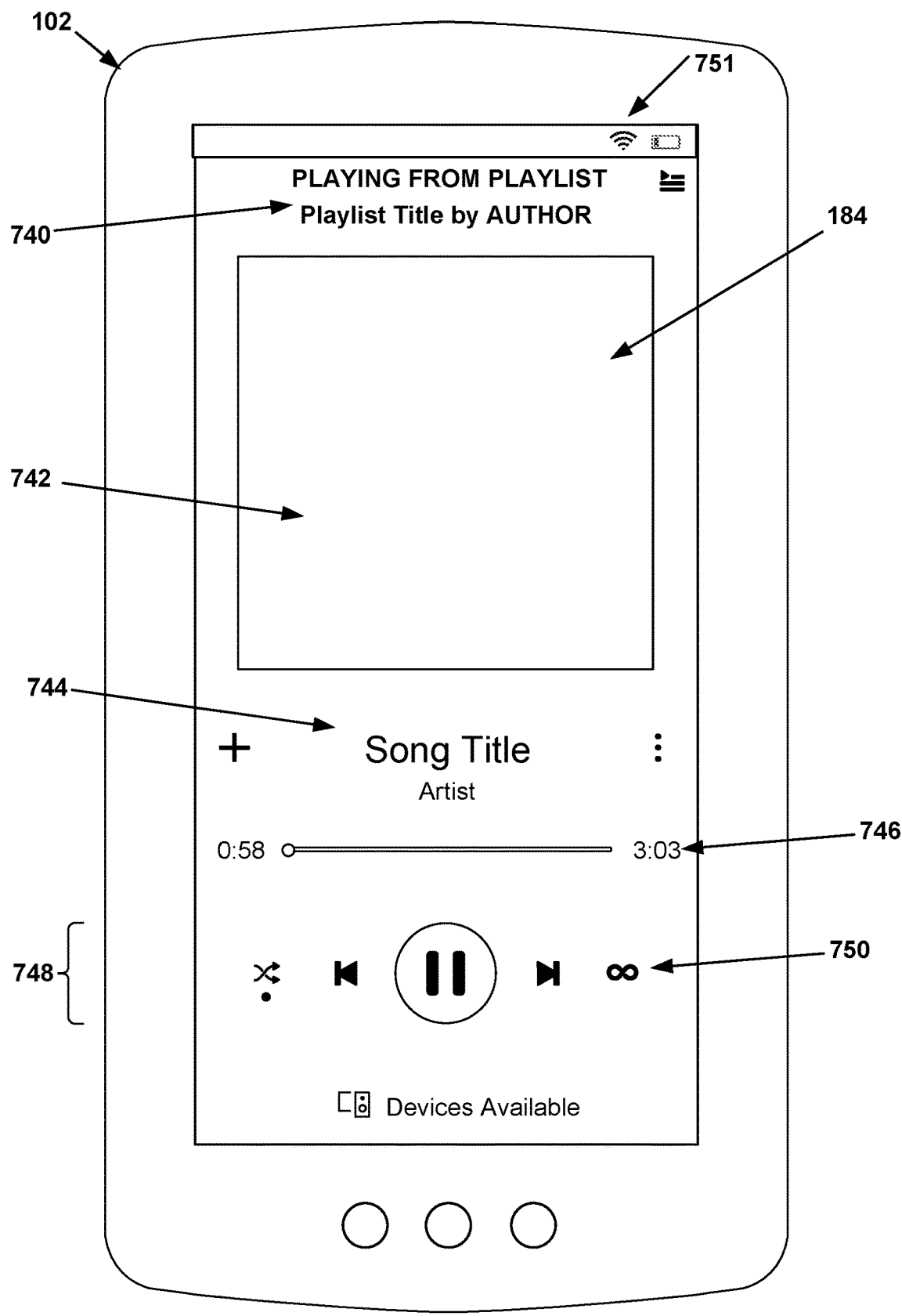
FIG. 17 illustrates an example display of a GUI presented on a media playback device for controlling playback of media content provided through a media streaming service.

FIG. 17 illustrates an example display of a GUI 184 presented on a media playback device 102 for controlling playback of media content provided through a media streaming service. The GUI 184 shows a view including information about currently playing media content and controls for controlling playback.

The GUI 184 includes playback controls 748 represented by graphical elements. Selection of these playback controls allows a user to navigate through a queue of media content items. The playback controls 748 shown in GUI 184 can be used to shuffle playback, skip backward, pause, play, or skip forward. Shown with the playback controls 748 is the autoplay switch 750. The autoplay switch 750 corresponds to the autoplay switch 188 of FIG. 2.

The GUI 184 also includes playlist information 740, artwork 742, media content item information 744, and a playback progress bar 746. More or fewer types of information can be displayed on the GUI 184 during media content playback on the media playback device 102.

The playlist information 740 can include a title of a currently playing queue of media content items. The author of the playlist or queue can also be displayed.

The artwork 742 can be displayed to represent the currently playing playlist or media content item. For example, artwork associated with a particular album can be displayed when a media content item from that album is being played. In other examples, the artwork 742 could be associated with the entire playlist and the display will remain the same as long as the same playlist is playing on the media playback device 102.

The media content item information 744 can include a title of the media content item that is currently playing. For example, the title could be of a particular song. The media content item information 744 can also include the name of an artist. For example, the artist could be a musical artist that performs the song that is currently playing. In other examples, the title could be of an audiobook and the artist could be the author of the book.

The playback progress bar 746 provides a graphical indication of how long the currently playing media content item is in duration and how far into the media content item the playback has progressed.

The autoplay switch 750 allows a user to enable or disable automatic playback of media content after the currently playing queue of media content concludes. It is beneficial to include the autoplay switch 750 on the GUI 184 for controlling media playback because a user can easily control the autoplay feature without accessing a separate menu screen for changing autoplay options or settings.

The autoplay switch 750 in FIG. 17 is shown as being enabled or on. The autoplay switch 750 could be visually emphasized by changing the color of the symbol, brightening the display of the symbol, or providing greater contrast between the symbol and the background of the GUI 184 to indicate that autoplay is enabled. In some embodiments, additional visual indicators are displayed to show that autoplay is enabled. For example, a dot could appear under the lemniscate icon to indicate that autoplay is enabled.

WLAN connection indicator 751 indicates that the media playback device 102 is connected to WLAN. The wifi control module 198 communicates with the wireless data communication device 134 to confirm that there is a strong enough signal to support media streaming.

Figure 18:
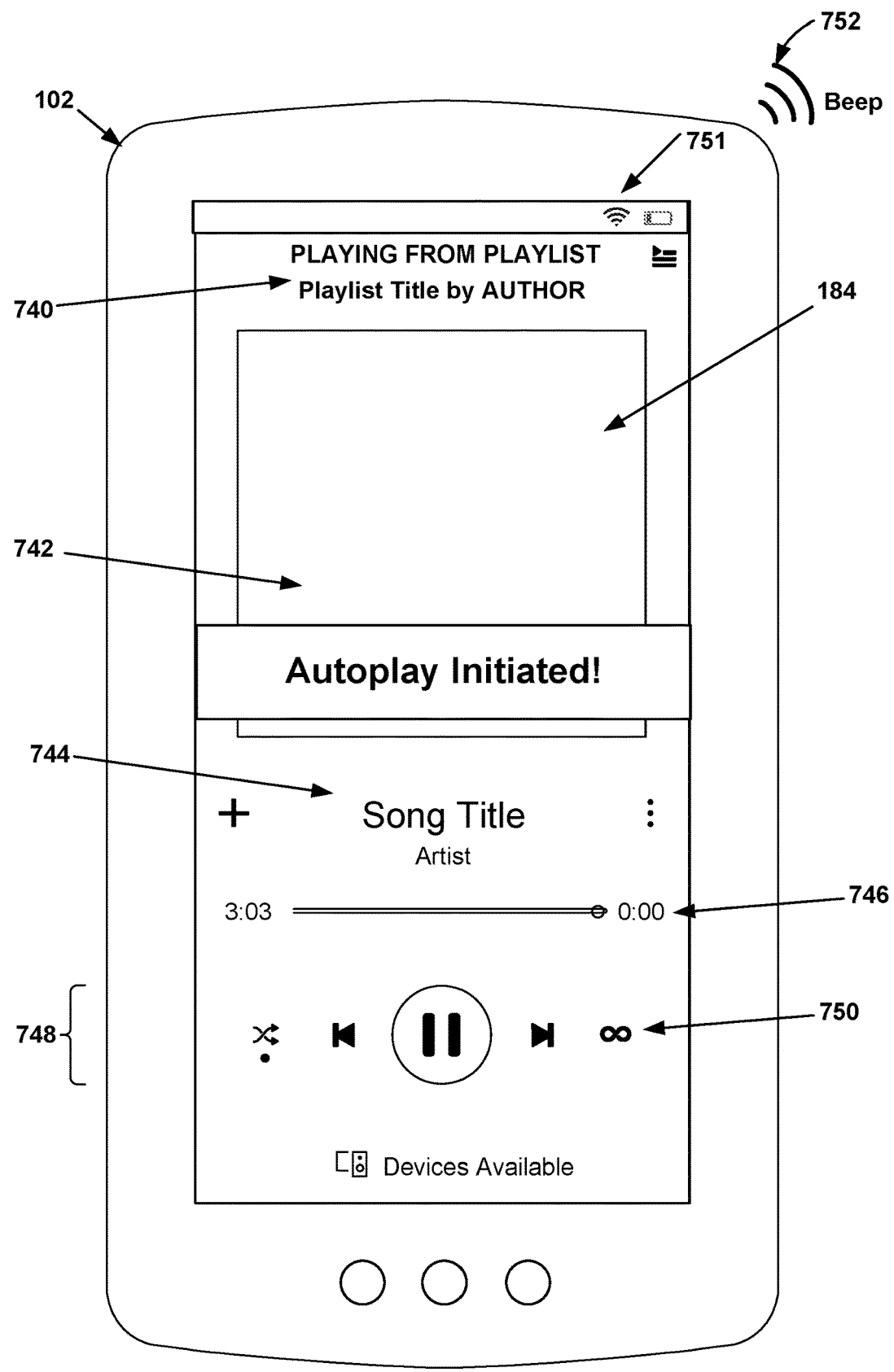
FIG. 18 illustrates another example display of a GUI presented on a media playback device for controlling playback of media content provided through a media streaming service.

FIG. 18 depicts the GUI 184 as playback shifts from the end of an initial queue of media content to the beginning of an autoplay queue of media content. The media content output device 140 emits an alert sound 752, which in this example is a short "beep" sound. At the same time, a message reading "Autoplay Initiated!" is displayed briefly on the GUI 184 of the media playback device 102. Other visual indications are possible.

Figure 19:
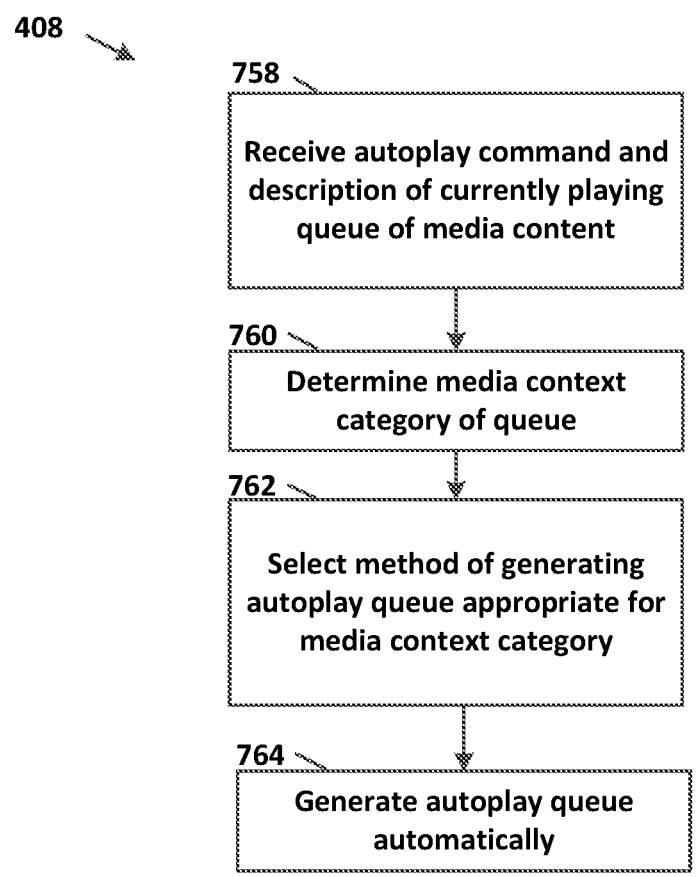
FIG. 19 is a flow chart of an example method of determining an autoplay queue of media content.

FIG. 19 is a flow chart of an example method 408 of determining a second, or autoplay, queue of related media content. The method 408 can be performed by the autoplay queue generator 118.

At operation 758, an autoplay command is received along with a description of the currently playing queue of media content. Information regarding the initial queue of media content can be received from the granular control module 116 with the command. Alternatively, the autoplay queue generator 118 can access information regarding the currently playing media context from the media stream service 222.

At operation 760, the media context category of the queue is determined. In some embodiments, this information is included with the autoplay command from the granular control module 116.

At operation 762, a method of generating an autoplay queue is selected that is appropriate for the media context category of the initial queue. Multiple methods of determining media content items to include in an autoplay queue can be utilized. An example is illustrated and described in further detail with reference to FIG. 20.

At operation 764, an autoplay command is communicated to the autoplay queue generator 118. This occurs only if autoplay is enabled for the currently playing context. The granular control module 116 issues a command to the autoplay queue generator 118.

Figure 20:
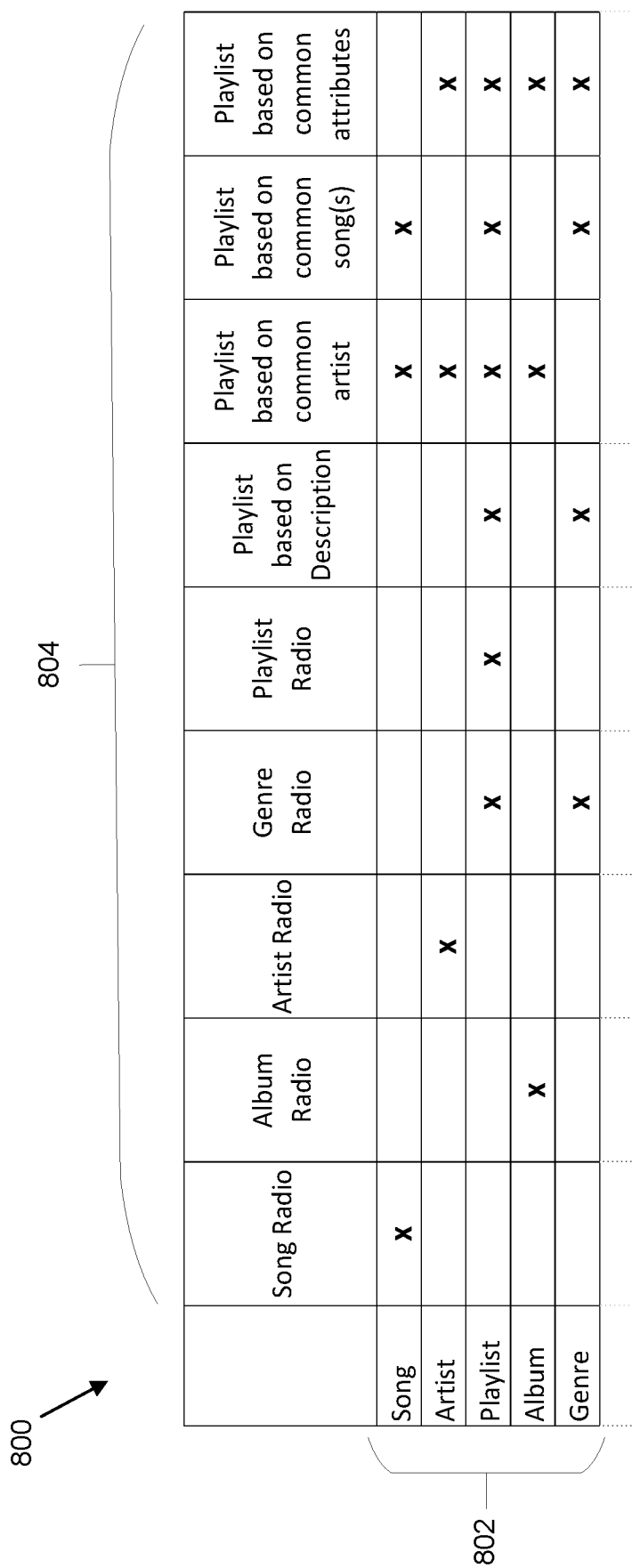
FIG. 20 is a table of example queue types that can be selected for an autoplay queue of related media content.

FIG. 20 is a table 800 of example queue types that can be selected for a second (autoplay) queue of related media content. In this table, x's are placed for each category of media context 802 to indicate which types of autoplay queues 804 are appropriate.

Autoplay queues can be set up in a multitude of ways. Such means of generating a queue can include radio stations and playlist based on the media content that is currently playing. Radio stations can be generated based on a song, an artist, an album, or a genre. Radio stations can also be based on playlists. Radio stations can be personalized to a user vector meaning that the media content of the radio station is customized based on a particular user is listening history. Radio stations can also be generated based on matching acoustic elements of most recently played songs with those that are being generated in the auto play queue. Radio stations continually update with new media content items indefinitely.

Playlists differ from radio stations in that they have a definite number of media content items. Playlist can be generated to include media content having a common artist or one or more songs. Media content items for playlists can be selected based on acoustic elements of most recently played songs. In addition, user attributes can be utilized to aid in selection of media content items. In some instances, the playlist can be generated based on having a common description with a currently playing playlist. For example if a user is listening to a playlist entitled "Upbeat+Summer Sun," the autoplay queue may select the playlist entitled summer beats based on common descriptors of the playlist. An example of playlist having common artists or songs, the autoplay queue may utilize a playlist that a user is likely to enjoy based on having songs that are by the same artist or include songs that are in the currently playing queue. for example, if the user is listening to an initial queue of music that consists of a particular artist album, the autoplay queue may consists of a playlist of multiple songs by the same artist.

FIG. 21 illustrates an example display 820 of an initial queue 822 of media content items. The album "High Hope" is currently playing.

FIG. 22 illustrates another view of the example display 820 of the initial queue of media content items 822 followed by an autoplay queue 824 of media content items. The autoplay queue generator 118 has identified a radio station (Album Radio-High Hope) based on the album as being appropriate media content for an autoplay queue. The media content items have been added to the "Now Playing" list.

FIG. 23 illustrates another GUI 830 that could be shown on the display device 132 of the media playback device 102. In this display, a prompt 831 is displayed asking a user to select from two autoplay queue options. The prompt 831 reads: "Your current playlist has ended. What do you want to play next?" This prompt 831 can be displayed at the same time that an audible notification sounds to indicate that the initial queue of media content has ended. A user of the media playback device 102 can select between a first option 832 to play the album radio for "High Hope" or a second option 834 to play a playlist entitled "This is Florence Machine." Upon selection, the autoplay queue will begin playback.

In some instances, if the user does not select one of the options within a predetermined period of time, the system will automatically select one of the autoplay queues to play. This period of time could be, for example, 10 seconds, 20 seconds, 30 seconds, 40 seconds, or 50 seconds. After selection, playback begins immediately.

FIG. 24 illustrates another view of the example display 820 of the initial queue of media content items 822 followed by an autoplay queue 824 of media content items. The playlist "This is Florence Machine" was selected from the options presented in FIG. 23. The media content items of the selected playlist have been added to the "Now Playing" list.

The methods and systems above provide the technical advantage of providing automatically generated media content for playback on a media playback device such that a user does not have to put much or any thought into selecting media content to play after an initially selected queue concludes playback. Users can continue to listen to media content that is similar, but still different from what was already playing. This is beneficial because users often do not want to interrupt what they are doing to browse through media content in order to keep media content playing. Overall, this disclosure provides the advantage of fewer user interactions to achieve a media consumption experience that is enjoyable for the user. This improves the efficiency of a media playback device operating to utilize a media streaming service.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

The invention claimed is:

1. A computer implemented method for configuring automatic playback settings on a media playback device, the method comprising:
    displaying a graphical user interface comprising a plurality of selectors for enabling and disabling automatic playback of one or more media context categories;
    receiving selections of one or more of the plurality of selectors;
    receiving a selection of media content for playback on the media playback device, the media content comprising an initial queue of media content items having a media context category of the one or more media context categories;
    retrieving the initial queue of media content items;
    determining whether the initial queue of media content items is enabled for automatic playback of media content based on the selections of the one or more of the plurality of selectors for enabling the automatic playback of the media context category of the initial queue of media content items;
    upon determining that the initial queue of media content items is enabled for automatic playback of media content, retrieving an autoplay queue of media content items based on the selections of the one or more of the plurality of selectors for enabling the automatic playback of the media context category of the initial queue of media content items, the autoplay queue of media content items being related to the initial queue of media content items; and
    upon concluding playback of the initial queue of media content items, automatically initiating playback of the autoplay queue of media content items.

2. The computer implemented method of claim 1, wherein the plurality of selectors comprise toggles.

3. The computer implemented method of claim 1, wherein the autoplay queue of media content items is selected based on at least one attribute associated with the initial queue of media content items.

4. The computer implemented method of claim 3, wherein the at least one attribute comprises one or more of:
    one or more acoustic elements of media content items in the initial queue of media content items;
    a user preference;
    a geographic location;
    a time of day; and
    an external attribute.

5. The computer implemented method of claim 1, wherein the autoplay queue of media content is selected based on a personalized user vector.

6. The computer implemented method of claim 1, wherein the autoplay queue of media content items includes a playlist of media content items selected for overlap with one or more of artists or tracks with the initial queue of media content items.

7. The computer implemented method of claim 1, wherein upon concluding playback of the initial queue of media content items and before automatically initiating playback of the autoplay queue of media content items, playing an audible notification on the media playback device.

8. A system for configuring automatic playback settings for queues of media content, the system comprising:
    a processing device; and
    a memory device storing instructions that, when executed by the processing device, cause the system to:
        receive selections of automatic playback settings, the selections enabling or disabling automatic playback of an autoplay queue for each of a plurality of media context categories;
        receive a selection of an initial queue of media content;
        stream the initial queue of media content to a media playback device;
        ascertain a media context category corresponding to the initial queue of media content being streamed;
        determine whether the media context category is enabled for automatic playback based on the selections of automatic playback settings, wherein the selections of the automatic playback setting include one or more selections of a plurality of selectors for enabling the automatic playback of the media context category of the autoplay queue; and
        when the media context category is enabled for automatic playback, generate the autoplay queue of media content items based on the selections of the one or more of the plurality of selectors for enabling the automatic playback of the media context category corresponding to the initial queue of media content, the media content items in the autoplay queue being related to the media content items in the initial queue.

9. The system of claim 8, further comprising a media playback device comprising:
    a processing device; and
    a memory device storing instructions that, when executed by the processing device, cause the system to:
        receive the selections of automatic playback settings;
        present the media content items of the initial queue and the autoplay queue;
        play the media content items of the initial queue and the autoplay queue; and
        generate a graphical user interface for presenting media playback options and receiving selections of commands for playing media content and configuring settings for media content playback.

10. The system of claim 8, wherein the memory device further includes instructions that, when executed by the processing device, causes the system to:

detect when an initial queue of media content items is concluding; and play an audible notification to indicate that playback of an autoplay queue will begin.

11. The system of claim 8, wherein the selections of automatic playback settings enable or disable automatic playback of the autoplay queue depending on availability of a wireless network connection; and wherein the memory device further includes instructions that, when executed by the processing device, causes the system to:

detect a status of the wireless network connection; and determine whether the automatic playback of the autoplay queue is enabled based on the selections of the automatic playback settings and the status of the wireless network connection.

12. One or more non-transitory computer-readable media having computer-executable instructions embodied thereon that, when executed by at least one computing device, cause the at least one computing device to:

display a graphical user interface on a display of the media playback device, the graphical user interface comprising:

an autoplay toggle selector for enabling and disabling automatic playback of a second queue of media content after a first queue of media content has concluded; and two or more context toggle selectors for enabling and disabling automatic playback of the second queue of media content based on a media context category of the first queue of media content;

upon receiving a selection to enable automatic playback, store the selection; and determine whether the first queue of media content items is enabled for the automatic playback of the second queue of media content based on selections of the autoplay toggle selector and the two or more context toggle selectors for enabling the automatic playback of the media context category of the first queue of media content; and retrieve the second queue of media content based on the selections of the autoplay toggle selector and the two or more context toggle selectors for enabling the automatic playback of the media context category of the first queue of media content, the second queue of media content being related to the first queue of media content.

13. The one or more non-transitory computer-readable media of claim 12, wherein the graphical user interface further comprises a toggle selector being operable to enable or disable playback of an audible notification to indicate that playback of the first queue has concluded and playback of the second queue will begin.

14. The one or more non-transitory computer-readable media of claim 12, wherein the graphical user interface further comprises a wireless connection toggle selector for enabling and disabling automatic playback of the second queue of media content based on connection status with a wireless network.

15. The one or more non-transitory computer-readable media of claim 12, wherein the two or more context toggle selectors are disabled when the autoplay toggle selector is set to disable automatic playback of the second queue of media content.

16. The one or more non-transitory computer-readable media of claim 12, wherein the two or more context toggle selectors are hidden when the autoplay toggle selector is set to disable automatic playback of the second queue of media content.

17. The one or more non-transitory computer-readable media of claim 12, wherein the instructions further cause the computing devices to:

present a graphical user interface on the media playback device, the graphical user interface displaying visual representations of two or more autoplay queues for selection.

18. The one or more non-transitory computer-readable media of claim 17, wherein the instructions further cause the computing devices to:

receive input through the graphical user interface indicating a selection of an autoplay queue for playback.

19. The one or more non-transitory computer-readable media of claim 17, wherein the instructions further cause the computing devices to:

automatically select an autoplay queue if no input is received after a predetermined length of time.

* * * * *